(12) United States Patent
Imai et al.

(10) Patent No.: US 9,210,415 B2
(45) Date of Patent: Dec. 8, 2015

(54) THREE-DIMENSIONAL PICTURE VIEWING SYSTEM, DISPLAY SYSTEM, OPTICAL SHUTTER, AND THREE-DIMENSIONAL PICTURE VIEWING METHOD

(75) Inventors: Masao Imai, Tokyo (JP); Junichirou Ishii, Tokyo (JP); Goroh Saitoh, Tokyo (JP); Fujio Okumura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 930 days.

(21) Appl. No.: 13/143,399

(22) PCT Filed: Jan. 13, 2010

(86) PCT No.: PCT/JP2010/050248
§ 371 (c)(1),
(2), (4) Date: Jul. 6, 2011

(87) PCT Pub. No.: WO2010/084803
PCT Pub. Date: Jul. 29, 2010

(65) Prior Publication Data
US 2011/0273545 A1    Nov. 10, 2011

(30) Foreign Application Priority Data
Jan. 22, 2009    (JP) ................................. 2009-012142

(51) Int. Cl.
H04N 13/04    (2006.01)
G02B 27/22    (2006.01)
H04N 13/00    (2006.01)

(52) U.S. Cl.
CPC ........ *H04N 13/0497* (2013.01); *G02B 27/2264* (2013.01); *H04N 13/007* (2013.01); *H04N 13/0438* (2013.01)

(58) Field of Classification Search
CPC ........... G02B 27/2264; H04N 13/0497; H04N 13/0438; H04N 13/007
USPC ...................................................... 348/55, 56
See application file for complete search history.

(56) References Cited

U.S. PATENT DOCUMENTS 8,531,509 B2 *    9/2013    Khan ............................... 348/56
2002/0008906 A1 *    1/2002    Tomita .......................... 359/462
(Continued)

FOREIGN PATENT DOCUMENTS

CN    1749808 A    3/2006
CN    101123734 A    2/2008
(Continued)

OTHER PUBLICATIONS

International Search Report for PCT/JP2010/050246 mailed Apr. 20, 2010.
(Continued)

*Primary Examiner* — Thai Tran
*Assistant Examiner* — Jose Mesa

(57) ABSTRACT

A three-dimensional picture viewing system includes: display system (2) that multiplexes and displays, in a time-division manner, three or more pictures including two or more pictures with different parallaxes and at least one subtitle picture and outputs a control signal indicating a switching timing of the pictures; input means (7) for designating an arbitrary display mode among a plurality of different display modes in which display pictures to be viewed are determined from among the three or more pictures; two shutters that switch a state between light transmission and light blocking; and a shutter driving circuit that specifies switching timings of the display pictures corresponding to the display mode designated by input means (7) based on the control signal, and independently controls opening/closing of the two shutters at the specified switching timing of the pictures.

15 Claims, 11 Drawing Sheets

(56) References Cited

U.S. PATENT DOCUMENTS

| | | | |
|---|---|---|---|
| 2004/0085260 A1* | 5/2004 | McDavid, III | 345/7 |
| 2005/0168630 A1* | 8/2005 | Yamada et al. | 348/383 |
| 2006/0126919 A1* | 6/2006 | Kitaura et al. | 382/154 |
| 2009/0073314 A1* | 3/2009 | Uemukai et al. | 348/468 |

FOREIGN PATENT DOCUMENTS

| | | |
|---|---|---|
| JP | 8-331601 A | 12/1996 |
| JP | 10-42318 A | 2/1998 |
| JP | 10-240212 A | 9/1998 |
| JP | H11-234703 A | 8/1999 |
| JP | 2001-112024 A | 4/2001 |
| JP | 2003-78843 A | 3/2003 |
| JP | 2003-189208 A | 7/2003 |
| JP | 2003248195 A | 9/2003 |
| JP | 2004219472 A | 8/2004 |
| JP | 2004274125 A | 9/2004 |
| JP | 20052865455 A | 10/2005 |
| JP | 2005311833 A | 11/2005 |
| JP | 2006-186768 A | 7/2006 |
| WO | 2008/115222 A1 | 9/2008 |

OTHER PUBLICATIONS

Japanese Office Action for JP Application No. 2010-547463 mailed on Jan. 28, 2014 with partial English Translation.

Chinese Office Action for CN Application No. 201080005358.3 issued on Aug. 9, 2013 with English Translation.

* cited by examiner

Fig.7

| DISPLAY IMAGE | | | PICTURE FOR RIGHT EYE R | SUBTITLE S | PICTURE FOR LEFT EYE L | PICTURE FOR RIGHT EYE R |
|---|---|---|---|---|---|---|
| CONTROL SIGNAL | | | | | | |
| DISPLAY MODE | THREE-DIMENSIONAL DISPLAY (WITH SUBTITLE) | SHUTTER FOR RIGHT EYE | Open | Close | Close | Open |
| | | SHUTTER FOR LEFT EYE | Close | Close | Open | Close |
| | THREE-DIMENSIONAL DISPLAY (WITHOUT SUBTITLE) | SHUTTER FOR RIGHT EYE | Open | Open | Close | Open |
| | | SHUTTER FOR LEFT EYE | Close | Open | Open | Close |

Fig.8

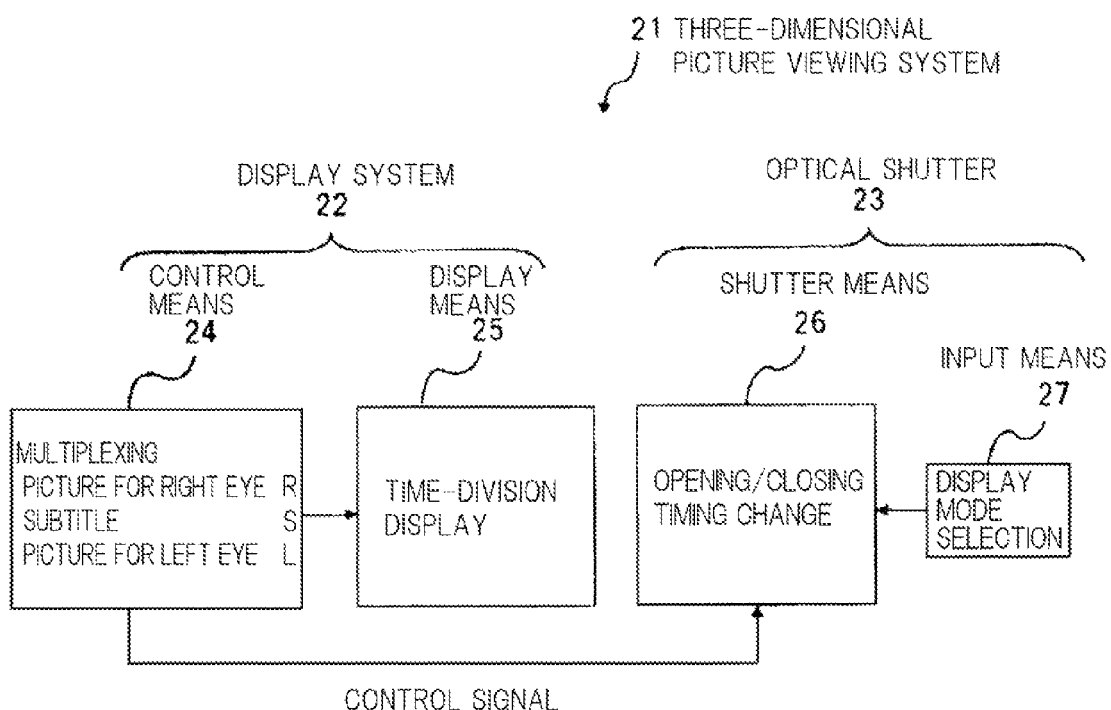

Fig.9

| DISPLAY IMAGE | | | PICTURE FOR RIGHT EYE R | SUBTITLE S | PICTURE FOR LEFT EYE L | PICTURE FOR RIGHT EYE R |
|---|---|---|---|---|---|---|
| CONTROL SIGNAL | | | | | | |
| DISPLAY MODE | THREE-DIMENSIONAL DISPLAY (WITH SUBTITLE) | SHUTTER FOR RIGHT EYE | Open | Close | Close | Open |
| | | SHUTTER FOR LEFT EYE | Close | Close | Open | Close |
| | THREE-DIMENSIONAL DISPLAY (WITHOUT SUBTITLE) | SHUTTER FOR RIGHT EYE | Open | Open | Close | Open |
| | | SHUTTER FOR LEFT EYE | Close | Open | Open | Close |
| | TWO-DIMENSIONAL IMAGE DISPLAY (WITHOUT SUBTITLE) | SHUTTER FOR RIGHT EYE | Open | Close | Close | Open |
| | | SHUTTER FOR LEFT EYE | Open | Close | Close | Open |
| | TWO-DIMENSIONAL IMAGE DISPLAY (WITH SUBTITLE) | SHUTTER FOR RIGHT EYE | Open | Open | Close | Open |
| | | SHUTTER FOR LEFT EYE | Open | Open | Close | Open |

(ONE FRAME / ONE SUBFRAME)

Fig.10

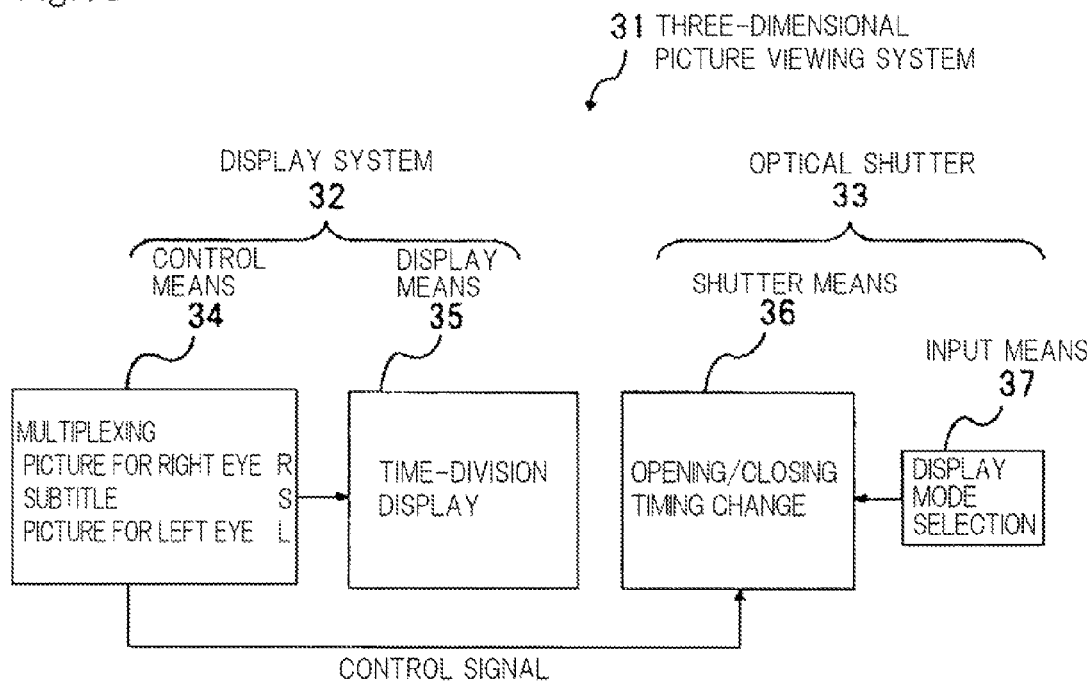

Fig.13

| | | | PICTURE FOR RIGHT EYE R | SUBTITLE S | PICTURE FOR LEFT EYE L1 | PICTURE FOR LEFT EYE L2 |
|---|---|---|---|---|---|---|
| | DISPLAY IMAGE | | | | | |
| | CONTROL SIGNAL | | ▔▔ | | ▔▔ | |
| DISPLAY MODE | THREE-DIMENSIONAL DISPLAY (WITH SUBTITLE) | SHUTTER FOR RIGHT EYE | Open | Close | Close | Close |
| | | SHUTTER FOR LEFT EYE | Close | Close | Open | Close |
| | THREE-DIMENSIONAL DISPLAY (WITHOUT SUBTITLE) | SHUTTER FOR RIGHT EYE | Open | Open | Close | Close |
| | | SHUTTER FOR LEFT EYE | Close | Open | Open | Close |
| | THREE-DIMENSIONAL DISPLAY (WITHOUT SUBTITLE) IN WHICH THREE-DIMENSIONALITY IS REDUCED | SHUTTER FOR RIGHT EYE | Open | Close | Close | Close |
| | | SHUTTER FOR LEFT EYE | Close | Close | Close | Open |
| | THREE-DIMENSIONAL DISPLAY (WITH SUBTITLE) IN WHICH THREE-DIMENSIONALITY IS REDUCED | SHUTTER FOR RIGHT EYE | Open | Open | Close | Close |
| | | SHUTTER FOR LEFT EYE | Close | Open | Close | Open |

Fig.14

| | | | PICTURE FOR RIGHT EYE R | SUBTITLE S | PICTURE FOR LEFT EYE L1 | PICTURE FOR LEFT EYE L2 |
|---|---|---|---|---|---|---|
| | DISPLAY IMAGE | | | | | |
| | CONTROL SIGNAL | | ▔▔ | | ▔▔ | |
| DISPLAY MODE | TWO-DIMENSIONAL IMAGE DISPLAY (WITHOUT SUBTITLE) | SHUTTER FOR RIGHT EYE | Open | Close | Close | Close |
| | | SHUTTER FOR LEFT EYE | Open | Close | Close | Close |
| | TWO-DIMENSIONAL IMAGE DISPLAY (WITH SUBTITLE) | SHUTTER FOR RIGHT EYE | Open | Open | Close | Close |
| | | SHUTTER FOR LEFT EYE | Open | Open | Close | Close |

THREE-DIMENSIONAL PICTURE VIEWING SYSTEM, DISPLAY SYSTEM, OPTICAL SHUTTER, AND THREE-DIMENSIONAL PICTURE VIEWING METHOD

TECHNICAL FIELD

The present invention relates to a three-dimensional picture viewing system, and more particularly to a three-dimensional picture viewing system that can display additional information such as subtitles.

BACKGROUND ART

There is a three-dimensional picture system that provides a three-dimensional display in which a right eye picture and a left eye picture, which have a parallax between left and right eyes, are provided to left and right eyes an observer wearing three-dimensional eyeglasses. Particularly, a three-dimensional film in which a picture is projected on a large screen can provide entertainment to audiences using films that are very popular.

Generally, when showing a foreign film, subtitles of a mother language may be provided. In some regions, subtitles of two or more languages may be necessary. In recent years, for hearing-impaired people, there has been an increase in case of displaying conversation contents or voice information with subtitles of a mother language even in a domestic film. On the other hand, some observers viewing films think that subtitles are unnecessary. Thus, requests for additional information such as subtitles have become diverse when a great many people simultaneously view one picture.

Even in the case of a picture that is very popular, similarly, displaying additional information such as subtitles is requested. However, the insertion of subtitles into a three-dimensional picture that uses two types of pictures, namely, a picture for a right eye and a picture for a left eye, increases complexity.

Visual fatigue occurs more easily in three-dimensional viewing of text information such as a subtitle than in three-dimensional viewing of a natural image. For example, when a head tilts, a subtitle seen by the right eye and a subtitle seen by the left eye are shifted up and down. In this case, binocular fusion of the subtitle of the right eye picture and the subtitle of the left eye picture becomes difficult, causing visual fatigue. A degree of this visual fatigue is larger than that of visual fatigue that occurs due to head tilting when the right eye picture and the left eye picture are simply fused between both eyes. Thus, subtitles must be displayed only for those who need a subtitle display, and the subtitle display must be more viewable.

Patent Literature 1 discloses a subtitle display system that allows only those needing a subtitle display to utilize the subtitle display. FIG. 1 is a block diagram showing a configuration of the subtitle display system discussed in Patent Literature 1.

Referring to FIG. 1, the subtitle display system includes AV (audio and visual) controller 101, subtitle file reproduction device 102, display unit 103, show controller 104, digital audio player 105, and subtitle signal transmission means (infrared modulator) 106.

AV controller 101 supplies a control signal for reproducing a subtitle file to subtitle file reproduction device 102 via serial interface 107. An output of subtitle file reproduction device 102 is transmitted to each user's display unit 103 via subtitle signal transmission means 106 based in an infrared ray or an electric wave.

The display unit 103 includes subtitle signal reception means (infrared receiver) 124 corresponding to subtitle signal transmission means 106. Display unit 103 includes a control unit for enabling selection of a subtitle of a desired language. To enable a viewer to select a subtitle of a desired language, subtitle signals of a plurality of different languages are transmitted at different frequencies, or transmitted by multiplex transmission. The viewer can accordingly display the subtitle of the desired language by operating a selection switch (not shown) located in display unit 103. As a configuration example of display unit 103, a goggle-shaped unit mountable on the head can be used.

With such configuration and operation, without any influence on those who do not require a subtitle display, a subtitle display can be provided to only those such as hearing-impaired people or foreigners needing the subtitle display.

Patent Literature 2 discloses a display system configured to use first and second polarized lights having polarization directions set orthogonal to each other, project one of the two subtitles for foreign languages to the first polarized light and the other subtitle to the second polarized light, and select one of the subtitles by using polarization eyeglasses. FIG. 2 is a block diagram showing a configuration of the display system discussed in Patent literature 2.

As shown in FIG. 2, the display system projects a picture to screen 212, and includes light source lamp 201, polarized light separation means 202, operation input means 203, selection circuit 204, picture signal processing circuit 205, first and second picture light generation means 6P and 6S, polarized light synthesis means 207, projection lens 208, memory 211, and viewing eyeglasses 9P and 9S as polarized light viewing means.

Light emitted from light source lamp 1 enters polarized light separation means 202, and is separated into two polarized lights orthogonal to each other, namely, a P wave and a S wave. The P wave is guided to enter picture light generation means 6P, and the S wave is guided to enter picture light generation means 6S.

When a user selects the language of a subtitle by operation input means 203, selection circuit 204 supplies picture signals Pi2 and Pi2 corresponding to the selected language and subtitle signals SB1 and SB2 indicating subtitles described in the selected language to picture signal processing circuit 205. Picture signal processing circuit 205 generates synthesized picture signal Ps1 (an English subtitle) synthesizing picture signal Pi1 with subtitle signal SB1, and synthesized picture signal Ps2 (a French subtitle) synthesizing picture signal Pi2 with subtitle signal SB2.

In memory 211, a function selection menu having a plurality of languages is prepared, and graphics data of messages corresponding to the respective languages are recorded. In response to a user's request, graphics data M1 and M2 are input to picture signal processing circuit 205, and together with subtitle signals SB1 and SB2, synthesized with synthesized picture signals Ps1 and Ps2.

Picture light generation means 6P outputs picture light PP of a P wave based on synthesized picture signal Ps1. Picture light generation means 6S outputs picture light PS of a S wave based on synthesized picture signal Ps2. Picture light PP of the P wave and picture light PS of the S wave are synthesized into one synthesized picture light PC by polarized light synthesis means 207. Synthesized picture light PC is projected from projection lens 208 to screen 212.

Viewer V1 wishing to view a picture with English subtitles uses P wave viewing eyeglasses 9P to which a polarization film transmitting the P wave is bonded. Viewer V2 wishing to view a picture with French subtitles uses S wave viewing eyeglasses 9S to which a polarization film transmitting the S wave is bonded. Thus, each viewer can view a picture with the subtitle of a desired language.

Patent Literature 3 discloses an image projection system configured to project subtitle images having polarized light components of projection light modulated in a superimposed manner, and enable observation of subtitles only when the audience wears polarization eyeglasses. FIG. 3 is a block diagram showing a configuration of the image projection system discussed in Patent Literature 3.

As shown in FIG. 3, the image projection system includes information processing device 311 for processing the signal of a projected image, image projection device 312 for magnifying and projecting an image, and polarization eyeglasses 320 for observing the projected image.

Information processing device 311 includes information processing unit 314 and image signal processing unit 315. Information processing unit 314 computes an image signal to be polarized and modulated based on an image signal or image information generated from main projection data 317, and an image signal or image information generated from modulated projection data 318 projected as polarized light modulation therefor.

Image projection device 312, which magnifies and projects an image, includes a light source (not shown), image generation unit 312a, and magnification-projection optical system 312b. Polarization eyeglasses 320 formed into the shape of eyeglasses has a lens portion including a polarization plate.

Images not observed when observation is performed in a state unrelated to polarization are modulated to be superimposed by changing the ratio of two polarization components orthogonal to each other. When it is not necessary to view the images, the presence of a modulated image is not bothersome, and the modulated image can be viewed by passage through the polarization plate when necessary. For example, when a subtitle is displayed as a modulated image, only those wearing polarization eyeglasses can read the subtitle. On the other hand, those not wearing polarization eyeglasses do not sense contents thereof.

CITATION LIST

Patent Literature

Patent Literature 1: JP2004-219472A (shown in FIG. 4)
Patent Literature 2: JP2005-311833A (shown in FIG. 7)
Patent Literature 3: JP2003-248195 (shown in FIG. 10)

DISCLOSURE OF THE INVENTION

In the subtitle display system discussed in Patent Literature 1, the display unit (eyeglasses) is required to include a character display function and an optical system such as a lens for causing characters to be visible at a position in the screen. As a result, the configuration becomes complex, and the price is high. There is also a problem of change in position of the subtitle with respect to the picture when the observer tilts his head.

In the systems discussed in Patent Literatures 2 and 3, a plurality of types of eyeglasses including those having a subtitle observation function added to the three-dimensional eyeglasses and those having no such function must be prepared.

An object of the present invention is to provide a three-dimensional picture viewing system, a display system, an optical shutter, and a three-dimensional viewing method that can solve the abovementioned problems, easily observe a picture with a subtitle and a picture without any subtitle by switching the display mode, and improving the viewability of subtitles.

In order to achieve the object, a three-dimensional picture viewing system according to the present invention includes:
a display system that multiplexes and displays, in a time-division manner, three or more pictures that include two or more pictures with different parallaxes, which constitute a three-dimensional picture, and at least one subtitle picture, and outputs a control signal that indicates a switching timing of each picture;
input means for designating an arbitrary display mode among a plurality of different display modes in which display pictures to be viewed are defined from among the three or more pictures;
two shutters that switch a state in which light is transmitted and a state in which light is blocked; and
a shutter driving circuit that specifies switching timings of the display pictures corresponding to the display mode designated by the input means based on the control signal, and independently controls opening/closing of the two shutters based on the specified switching timings of the pictures.

A display system according to the present invention includes:
control means for outputting a three-dimensional picture signal that is generated by multiplexing three or more pictures that include two or more pictures with different parallaxes, which constitute a three-dimensional picture, and at least one subtitle picture in a time-division manner, and for outputting a control signal that indicates frame switching of the three-dimensional picture signal; and
display means for displaying a picture based on the three-dimensional picture signal from the control means. In this case, the control signal is supplied to an external device that observes only display pictures to be viewed from among the three or more pictures based on the control signal.

An optical shutter according to the present invention, which is communicable with a display system that multiplexes and displays, in a time-division manner, three or more pictures that include two or more pictures with different parallaxes, which constitute a three-dimensional picture, and at least one subtitle picture, and that outputs a control signal that indicates a switching timing of each picture, includes:
input means for designating an arbitrary display mode among a plurality of display modes in which display pictures to be viewed are defined from among the three or more pictures;
two shutters that switch a state in which light is transmitted and a state in which light is blocked; and
a shutter driving circuit that specifies switching timings of the display pictures corresponding to the display mode designated by the input means based on the control signal, and that independently controls opening/closing of the two shutters based on the specified switching timings of the pictures.

A three-dimensional picture viewing method according to the present invention multiplexes and displays, in a time-division manner, three or more pictures that include two or more pictures with different parallaxes, which constitute a three-dimensional picture, and at least one subtitle picture by a display system, and observes the displayed pictures via two shutters that switch a state in which light is transmitted and a state in which light is blocked, and includes:

receiving a control signal that indicates switching timings of the three or more pictures from the display system; and specifying, when an arbitrary display mode is designated from among a plurality of different display modes in which display pictures to be viewed are defined from among the three or more pictures, switching timings of the display pictures corresponding to the designated display mode based on the control signal, and independently controlling opening/closing of the two shutters based on the specified switching timings of the pictures.

BRIEF DESCRIPTION OF DRAWINGS

FIG. 7 An explanatory timing chart showing a relationship between a state of the optical shutter and a display mode in the three-dimensional picture viewing system shown in FIG. 4.

FIG. 8 A block diagram showing a configuration of a three-dimensional picture viewing system according to a second exemplary embodiment of the present invention.

FIG. 9 An explanatory timing chart showing a relationship between a state of an optical shutter and a display mode in the three-dimensional picture viewing system shown in FIG. 8.

FIG. 10 A block diagram showing a configuration of a three-dimensional picture viewing system according to a third exemplary embodiment of the present invention.

FIG. 13 An explanatory timing chart showing a relationship between a state of the optical shutter and a display mode in the three-dimensional picture viewing system shown in FIG. 10.

FIG. 14 An explanatory timing chart showing a relationship between the state of the optical shutter and another display mode in the three-dimensional picture viewing system shown in FIG. 10.

Figure 1:
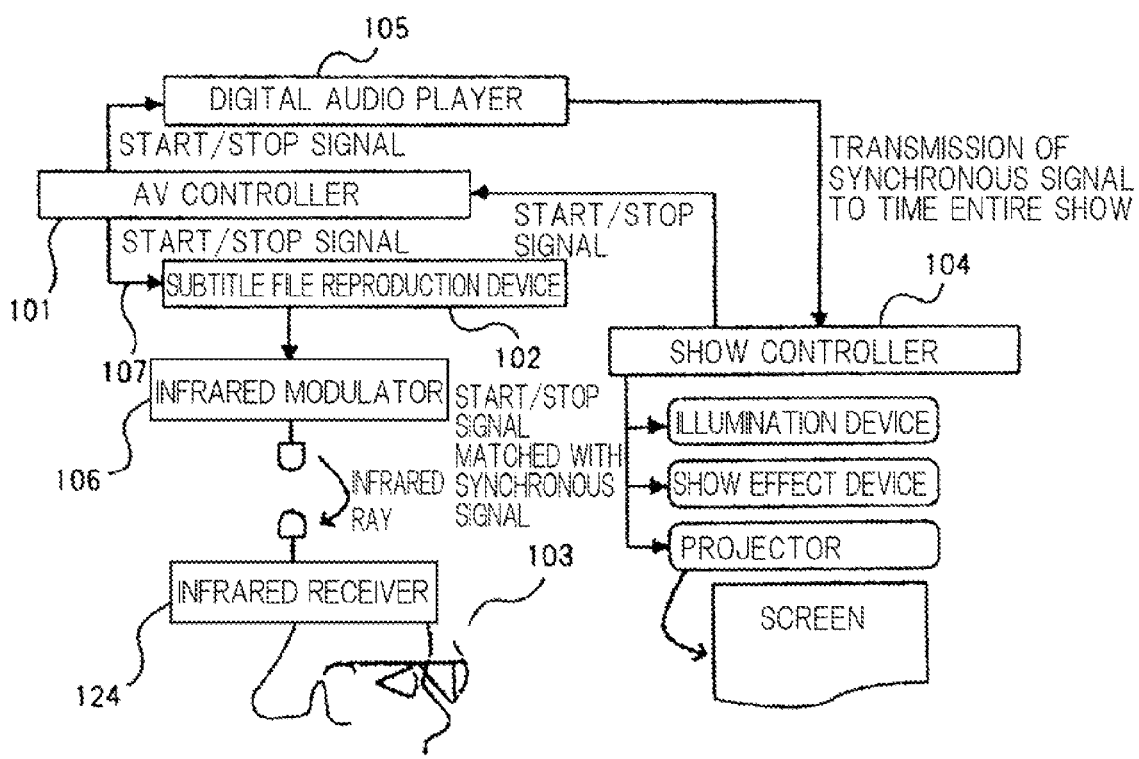
FIG. 1 A block diagram showing a configuration of a subtitle display system discussed in Patent Literature 1.
Figure 2:
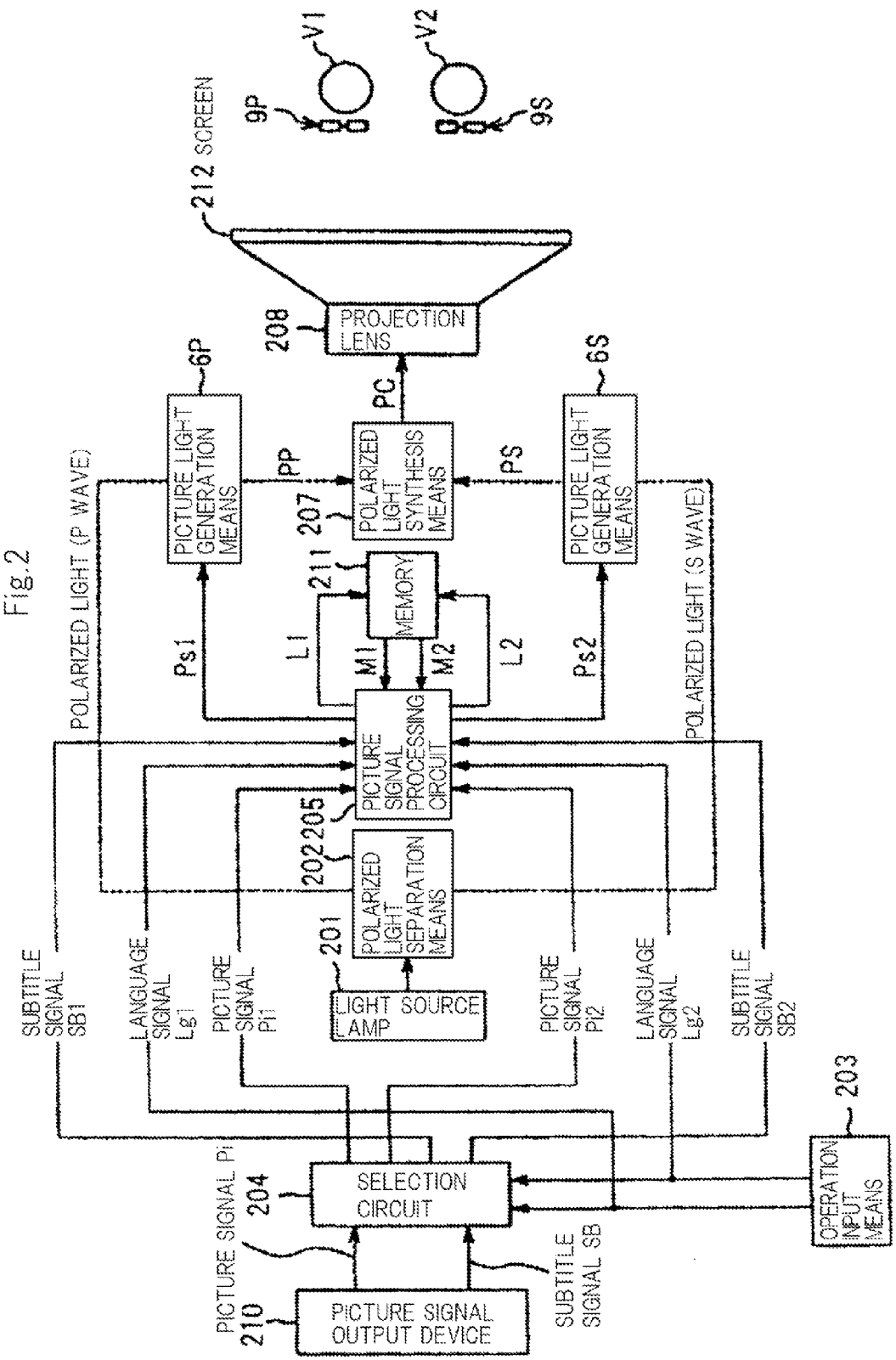
FIG. 2 A block diagram showing a configuration of a display system discussed in Patent Literature 2.
Figure 3:
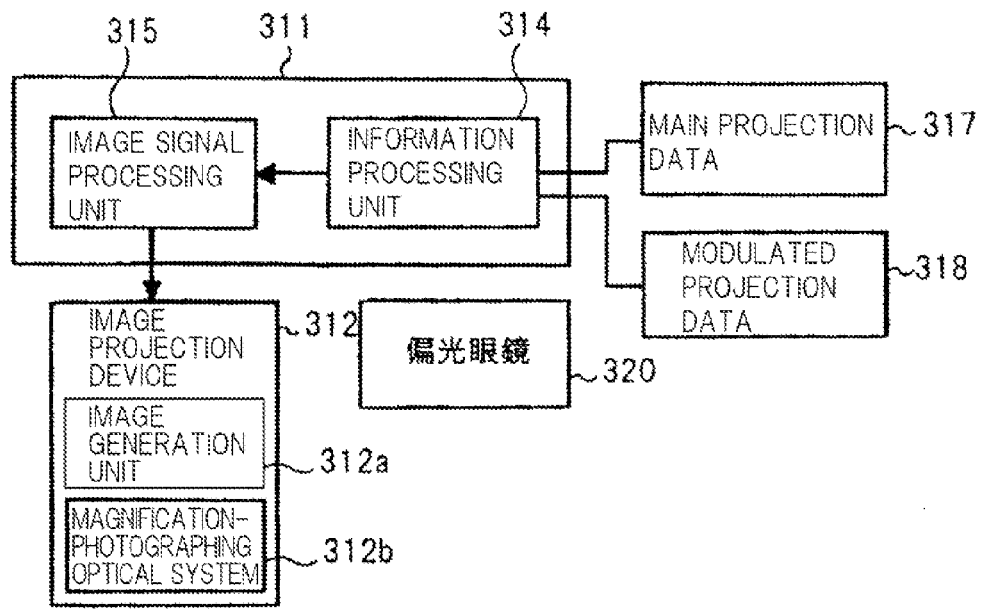
FIG. 3 A block diagram showing a configuration of an image projection system discussed in Patent Literature 3.

EXPLANATION OF REFERENCE NUMERALS 1 three-dimensional picture viewing system
2 display system
3 optical system
4 control means
5 display means
6 shutter means
7 input means

DESCRIPTION OF EMBODIMENTS

Hereinafter, exemplary embodiments of the present invention are described with reference to the drawings.

First Exemplary Embodiment

Figure 4:
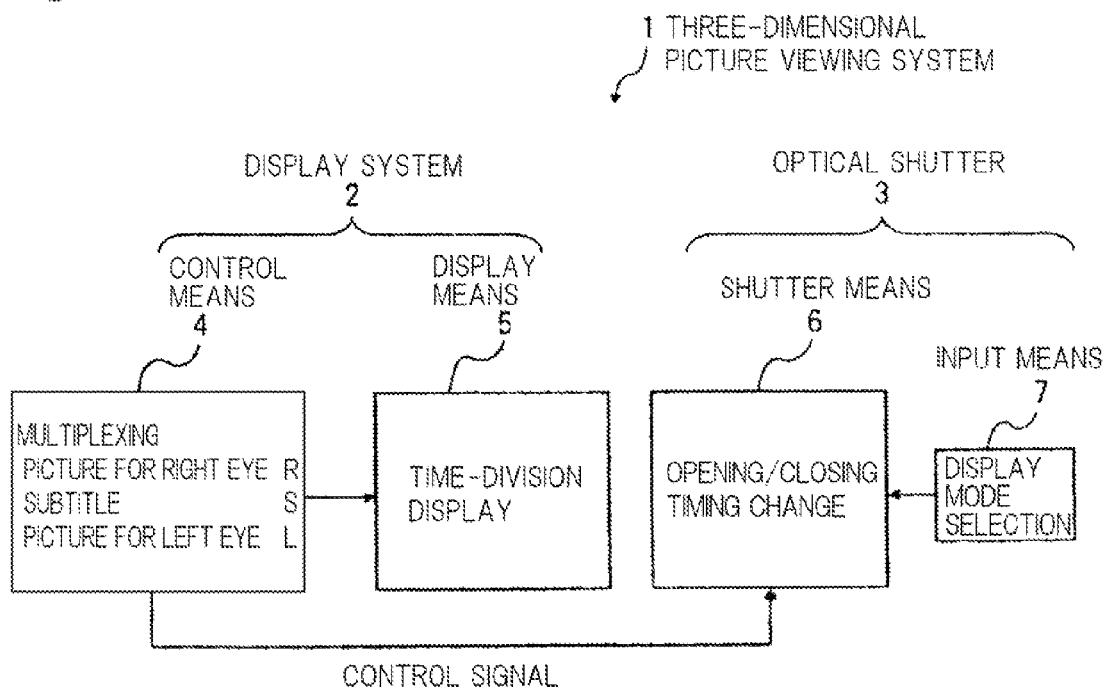
FIG. 4 A block diagram showing a configuration of a three-dimensional picture viewing system according to a first exemplary embodiment of the present invention.

FIG. 4 is a block diagram showing a configuration of a three-dimensional picture viewing system according to a first exemplary embodiment of the present invention. In the embodiment, an observer views a three-dimensional picture by appropriately selecting one of two display modes, namely, a three-dimensional display without any subtitle (with no subtitle) and a three-dimensional display with a subtitle (with a subtitle).

As shown in FIG. 4, three-dimensional picture viewing system 1 includes display system 2 and optical shutter 3. Display system 2 includes control means 4 and display means 5. Optical shutter 3 includes shutter means 6 and input means 7.

Control means 4 multiplexes, in a time-division manner, each picture signal of right eye picture R and left eye picture L, which constitute a three-dimensional picture, and of subtitle S, to generate a three-dimensional picture signal. Control means 4 transmits the three-dimensional picture signal to display means 5. Simultaneously, control means 4 transmits a control signal indicating frame switching of a picture to shutter means 6.

Display means 5 time-sequentially switches and displays right eye picture R, subtitle S, and left eye picture L from the input three-dimensional picture signal. Shutter means 6 is, for example, a liquid crystal optical shutter, and includes a liquid crystal optical shutter for a right eye and a liquid crystal optical shutter for a left eye, which constitute three-dimensional eyeglasses. The right eye and left eye liquid crystal optical shutters can independently be controlled to be opened/closed.

Input means 7 can select a display mode, and supplies a signal indicating a display mode selected by the observer to shutter means 6. Shutter means 6 determines, according to the display mode that the observer has selected by input means 7, opening/closing timings of the right eye and left eye liquid crystal optical shutters based on the control signal from control means 4, and controls opening/closing of the liquid crystal optical shutters.

Figure 5:
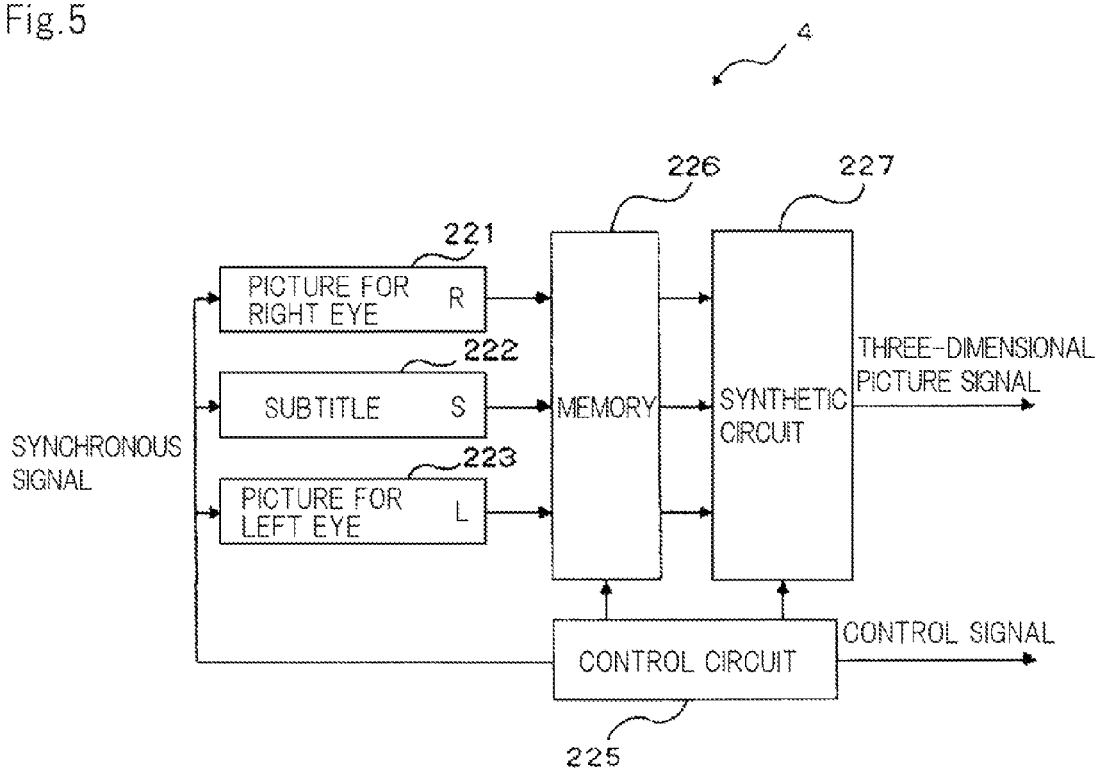
FIG. 5 A block diagram showing a specific configuration of control means of the three-dimensional picture viewing system shown in FIG. 4.

FIG. 5 is a block diagram showing a specific configuration of control means 4. As shown in FIG. 5, control means 4 includes three picture playback devices 221, 222, and 223, control circuit 225, memory 226, and synthetic circuit 227.

Picture playback device 221 plays a medium on which right eye picture R has been recorded. Picture playback device 222 plays a medium on which subtitle S has been recorded. Picture playback device 223 plays a medium on which left eye picture L has been recorded. A synchronous signal is supplied to each of picture playback devices 221, 222, and 223 from control circuit 225. Picture playback devices 221, 222, and 223 reproduce frames of the media in synchronization based on the synchronous signal from control circuit 225. Picture signals reproduced at picture playback devices 221, 222, and 223 in synchronization are output to memory 226.

The procedure for making a recoding media on which right eye picture R and left eye picture L have been recorded is briefly described. To acquire right eye picture R and left eye picture L, first and second cameras located at the interval of both human eyes are used. Right eye picture R and left eye picture L are shot by the first and second cameras. The pictures from the first and second cameras are directly recorded, or edited and processed to be recorded on a medium such as a magnetic tape. The media on which right eye picture R and left eye picture L have been recorded are accordingly acquired. As recording media, a DVD (digital versatile disc) and a hard disk can be used in addition to the magnetic tape.

Picture playback devices 221, 222, and 223 can be located in different places. In such a case, right eye picture R, subtitle S, and left eye picture L are respectively supplied from picture playback devices 221, 222, and 223 to memory 226 via a network.

Each image data of right eye picture R, subtitle S, and left eye picture L is stored by frames in memory 226. Control circuit 225 controls reading of the image data from memory 226. In memory 226, each image data that has been stored is sequentially read at a frequency three times larger than that of the synchronous signal. Each image data read from memory 226 is supplied to synthetic circuit 227.

An operation of synthetic circuit 227 is controlled by control circuit 225. Synthetic circuit 227 multiplexes, in a time-division manner, the image data sequentially read from memory 226 at a frequency that is three times larger than that of the synchronous signal. In other words, synthetic circuit 227 time-sequentially synthesizes signals of right eye picture R, subtitle S, and left eye picture L are at a frequency that is three times larger that of the synchronous signal to generate a three-dimensional picture signal. One frame of the three-dimensional picture signal includes three subframes of right eye picture R, subtitle S, and left eye picture L. During the generation of the three-dimensional picture signal by synthetic circuit 227, control circuit 225 generates a control signal synchronized with the generated three-dimensional picture signal.

Display system 2 can be configured such that the three-dimensional picture signal generated by synthetic circuit 227 is recorded on a recording medium and the recording medium is played when necessary. In such a case, a control signal is generated from a synchronous signal synchronized with a three-dimensional picture signal acquired by playing the recording medium.

Figure 6:
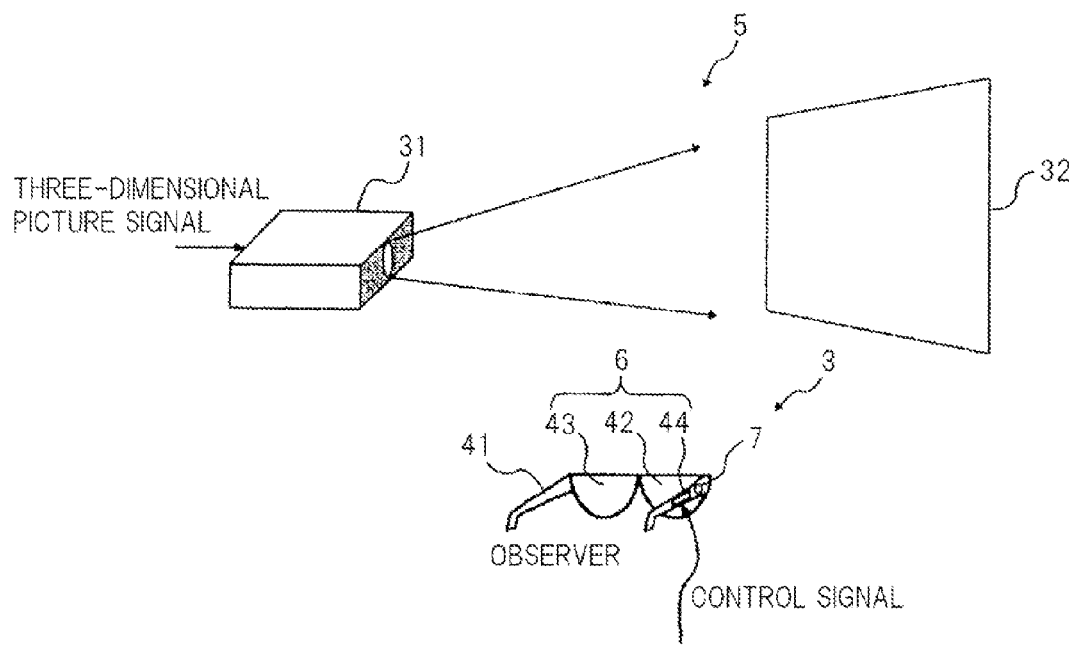
FIG. 6 A schematic view showing a specific configuration of display means and an optical shutter of the three-dimensional picture viewing system shown in FIG. 4.

FIG. 6 shows a specific configuration of display means 5 and optical shutter 3.

Display means 5 shown in FIG. 6 includes projector 31 and screen 32. Projector 31 receives the three-dimensional picture signal input from control means 4, and time-sequentially projects right eye picture R, subtitle S, and left eye picture L to screen 32.

The observer views the three-dimensional picture through optical shutter 3 shown in FIG. 6. Optical shutter 3 includes shutter means 6 that includes right eye optical shutter 42, left eye optical shutter 43, and optical shutter driving circuit 44, and input means 7 for selecting a display mode. In the embodiment, optical shutter 3 is formed into a shape of eyeglasses, namely, three-dimensional eyeglasses 41.

Right eye optical shutter 42 and left eye optical shutter 43 are liquid crystal optical shutters, each of which includes a liquid crystal cell in which a cell is formed by using two glass substrates on which transparent electrodes are formed and a liquid crystal is filled in a space between the glass substrates, a polarization plate being provided to the light entrance/exit surface of the liquid crystal cell. Right eye optical shutter 42 and left eye optical shutter 43 transmit light when no voltage is applied to the transparent electrodes, and block light when voltages are applied to the transparent electrodes.

Optical shutter driving circuit 44 determines, according to the display mode that the observer has selected by input means 7, opening/closing timings based on the control signal transmitted from control means 4, and independently controls opening/closing of right eye optical shutter 42 and left eye optical shutter 43.

In FIG. 6, the control signal can be supplied to optical shutter driving circuit 44 by wire communication, infrared communication or wireless communication.

Input means 7 and optical shutter driving circuit 44 can be installed as separate units in place of being included in three-dimensional eyeglasses 41. For example, in a movie theater, input means 7 or optical shutter driving circuit 44 can be mounted to the backrest of a front seat, and a signal to drive the liquid crystal optical shutter can be supplied from optical shutter driving circuit 44 to three-dimensional eyeglasses 41.

FIG. 7 is a timing chart showing the relationship among a display picture displayed by display means 5, a control signal, and a state of the optical shutter of three-dimensional eyeglasses 41 in each display mode.

The display picture is displayed at a repetition frequency of 60 hertz with right eye picture R, subtitle S, and left eye picture L constituting one frame. In other words, a picture of each subframe is switched at a frequency of 180 hertz to be displayed.

The control signal is set to a high level only when, for example, right eye picture R is displayed. Based on this signal, display timings of subtitle S and left eye picture L can be specified. The control signal is not limited to the signal shown in FIG. 7. Any signal can be used as long as it can specify a switching timing of the frame of each picture.

An observer needing no subtitle selects a three-dimensional display (without a subtitle) as a display mode. When the three-dimensional display (without a subtitle) is selected, the optical shutter is controlled to open, based on the control signal, right eye optical shutter 42 when right eye picture R is displayed, and open left eye optical shutter 43 when left eye picture L is displayed. The observer watches right eye picture R and left eye picture L respectively with left and right eyes, and can accordingly view a normal three-dimensional picture.

On the other hand, an observer needing a subtitle selects a three-dimensional display (with a subtitle). When the three-dimensional display (with a subtitle) is selected, the optical shutter is controlled to open, based on the control signal, right eye optical shutter 42 when right eye picture R and subtitle S are displayed, and open left eye optical shutter 43 when subtitle S and left eye picture L are displayed. The observer watches right eye picture R and left eye picture L respectively with left and right eyes, and can accordingly view a three-dimensional picture and read subtitle S.

In the embodiment, the one-frame period includes the three subframes, namely, right eye picture R, subtitle S, and left eye picture L, and the pictures for the right eye and the left eye are selected therefrom. On the other hand, when simply four subframes, namely, right eye picture R without a subtitle, right eye picture R with a subtitle, left eye picture L without a subtitle, and left eye picture with a subtitle, constitute one frame, and the pictures for the right eye and the left eye are selected therefrom, if a frame period is equal to that of the embodiment, a subframe period is shorter than that in the embodiment. When the subframe period is short, an image to be observed becomes dark. In the embodiment, the number of subframes can be reduced, and hence a period in which the optical shutter is open per unit time is longer, and the observer can view a bright image.

Both eyes watch a subtitle of the same subframe displayed in the same position of the screen and at the same timing, and hence no shifting occurs between a subtitle seen by the right eye and a subtitle seen by the left eye even when the observer tilts his head. In other words, an easily viewable subtitle display similar to that when a normal two-dimensional image is viewed can be acquired.

As display means 5, the example of the projection type display device that uses projector 31 and screen 32 has been described. However, a direct-view-type display device such as a liquid crystal television or a plasma television can be used.

The control signal transmitted from control means 4 to shutter means 6 can be transmitted to shutter means 6 via display means 5.

Display means 5 is not limited to the inclusion of one projector. Display means 5 can include two projectors that respectively display a three-dimensional picture and a subtitle picture. In this case, the two projectors are synchronized with each other, and a relationship among right eye picture R, subtitle S, and left eye subtitle L, which are displayed in time-sequence, is similar to that described above. Further, in this case, a subframe period of subtitle S does not need to be equal to that of each three-dimensional picture. By setting only a display period of subtitle S short, the pictures can be projected by the bright projector.

Second Exemplary Embodiment

It is known that a three-dimensional display in which a right eye picture and a left eye picture, which have a parallax between left and right eyes, are provided to left and right eyes causes an observer to experience visual fatigue. It is difficult for an observer who is good at or accustomed to three-dimensional viewing to experience visual fatigue. On the other hand, for an observer not good at or unaccustomed to three-dimensional viewing, a great deal of visual fatigue will be experienced. In other words, the degree of visual fatigue varies depending on the viewer's three-dimensional viewing aptitude. Thus, there is an individual difference in the degree of visual fatigue.

Therefore, when a large audience views the same three-dimensional picture such as a three-dimensional film, a three-dimensional picture viewing system that enables each observer to select a three-dimensional picture or a two-dimensional picture according to his three-dimensional viewing aptitude, and even making a selection in which a subtitle is present is useful.

FIG. 8 is a block diagram showing a configuration of a three-dimensional picture viewing system according to a second exemplary embodiment of the present invention.

According to the embodiment, an observer not good at three-dimensional viewing or an observer who feels visual fatigue can select a two-dimensional image, and even make a selection in which a subtitle is present.

As shown in FIG. 8, three-dimensional picture viewing system 21 includes display system 22 and optical shutter 23. Display system 22 includes control means 24 and display means 25. Optical shutter 23 includes shutter means 26 and input means 27.

In the embodiment, a configuration and an operation of control means 24 are similar to those of control means 4 shown in FIG. 5, and a configuration and an operation of display means 25 are similar to those of display means 5 shown in FIG. 6. A configuration of shutter means 26 is similar to that of shutter means 6 described in the first embodiment.

An observer can appropriately select, one of four display modes, namely, a three-dimensional display having no subtitle (without a subtitle), a three-dimensional display having a subtitle (with a subtitle), a two-dimensional image display having no subtitle (without a subtitle), and a two-dimensional image display having a subtitle (with a subtitle) by input means 27 to view a three-dimensional picture.

Shutter means 26 determines, according to the display mode that the observer has selected by input means 27, an opening/closing timing and an opening/closing period based on a control signal, and controls opening/closing of right eye and left eye liquid crystal shutters.

FIG. 9 is a timing chart showing a relationship among a display picture displayed by display means 25, a control signal, and a state of the optical shutter of three-dimensional eyeglasses 41 in each display mode.

As in the case of the first embodiment, the display picture is displayed at a repetition frequency of 60 hertz with right eye picture R, subtitle S, and left eye picture L constituting one frame. In other words, a picture of each subframe is switched at a frequency of 180 hertz to be displayed.

The control signal is set to a high level only when, for example, right eye picture R is displayed. Based on this signal, display timings of subtitle S and left eye picture L can be specified.

When the observer selects a three-dimensional display having no subtitle (without a subtitle) and a three-dimensional display having a subtitle (with a subtitle), as in the case of the timing chart of FIG. 7, opening/closing of the right eye and left eye liquid crystal optical shutters is controlled.

An observer who is not good at three-dimensional viewing or who experiences visual fatigue and who does not need a subtitle selects a two-dimensional image display (without a subtitle) as the display mode. When the two-dimensional image display (without a subtitle) is selected, optical shutter 23 is controlled to open, based on the control signal, right eye optical shutter 42 and left eye optical shutter 43 when right eye picture R is displayed, and to close right eye optical shutter 42 and left eye optical shutter 43 in other cases. In this case, the observer watches only right eye picture R simultaneously by left and right eyes, and can accordingly view a normal two-dimensional image.

On the other hand, an observer who is not good at three-dimensional viewing or who experiences visual fatigue and who needs a subtitle selects a two-dimensional image display (with a subtitle). When the two-dimensional image display (with a subtitle) is selected, optical shutter 23 is controlled to open, based on the control signal, right eye optical shutter 42 and left eye optical shutter 43 when right eye picture R and subtitle S are displayed, and to close right eye optical shutter 42 and left eye optical shutter 43 in other cases. In this case, the observer watches right eye picture R and subtitle S simultaneously by left and right eyes, and can accordingly view a normal two-dimensional image with a subtitle.

Though not shown in FIG. 9, a pseudo three-dimensional display mode can be set, in which when the two-dimensional image display is selected, right eye optical shutter 42 or left eye optical shutter 43 is always closed, and the other optical shutter is opened when right eye picture R is displayed (without a subtitle) or when right eye picture R and subtitle S are displayed (with a subtitle). When a picture is viewed with one eye, it is difficult to sense that the screen is planar, and a sense of depth can be acquired based on a depth cue (e.g., motion, perspective, or a shadow of the picture) other than a parallax between both eyes. Thus, even an observer who finds three-dimensional viewing difficult due to a parallax between both eyes can view a three-dimensional picture. The pseudo three-dimensional display mode can be effective particularly in the case of a large screen picture such as a film.

According to the embodiment, when a large audience simultaneously views the same three-dimensional picture such as a three-dimensional film, each observer can select, according to his own three-dimensional viewing aptitude, a three-dimensional picture or a two-dimensional picture on the spot, and make a selection in which a subtitle is present. As a result, a three-dimensional picture viewing system that gives consideration to a universal design enabling more people to view an easily viewable three-dimensional film can be acquired.

Third Exemplary Embodiment

A three-dimensional picture viewing system is more useful, which enables, in addition to the display selection of the second exemplary embodiment, when the large audience simultaneously views the same three-dimensional picture such as a three-dimensional film, an observer good at or accustomed to three-dimensional viewing to view a normal three-dimensional picture, and an observer not good at or unaccustomed to three-dimensional viewing to view a picture having three-dimensionality reduced or a two-dimensional picture, and to make a selection in which a subtitle is present.

FIG. 10 is a block diagram showing a configuration of a three-dimensional picture viewing system according to a third exemplary embodiment of the present invention.

In the embodiment, the observer views a three-dimensional picture by appropriately selecting one mode from among six display modes, namely, a three-dimensional display without a subtitle, a three-dimensional display with a subtitle, a three-dimensional display without a subtitle having three-dimensionality reduced, a three-dimensional display with a subtitle having three-dimensionality reduced, a two-dimensional image display without a subtitle, and a two-dimensional image display with a subtitle. The three-dimensional display without a subtitle having three-dimensionality reduced and the three-dimensional display with a subtitle having three-dimensionality reduced are for the observer who is not good at three-dimensional viewing or the observer who experiences visual fatigue.

As shown in FIG. 10, three-dimensional picture viewing system 31 includes display system 32 and optical shutter 33. Display system 32 includes control means 34 and display means 35. Optical shutter 33 includes shutter means 36 and input means 37.

Control means 34 multiplexes picture signals of right eye picture R, left eye picture L1, subtitle S, and left eye picture L2 having three dimensionality reduced, which constitute a three-dimensional picture, in a time-division manner to generate a three-dimensional picture signal, and transmits the three-dimensional picture signal to display means 35. Simultaneously, control means 34 transmits a control signal indicating frame switching of the pictures to shutter means 36.

Display means 35 time-sequentially switches and displays right eye picture R, subtitle S, left eye picture L1, and left eye picture L2 having the three dimensionality reduced based on the input three-dimensional picture signal. Shutter means 36 includes right eye and left eye optical shutters constituting three-dimensional eyeglasses, which are similar to those of the first embodiment. The right eye and left eye liquid crystal optical shutters can independently control opening/closing. Shutter means 36 determines, according to a display mode that the observer has selected by input means 37, an opening/closing timing and an opening/closing period based on the control signal to control opening/closing of the right eye and left eye optical shutters.

Figure 11:
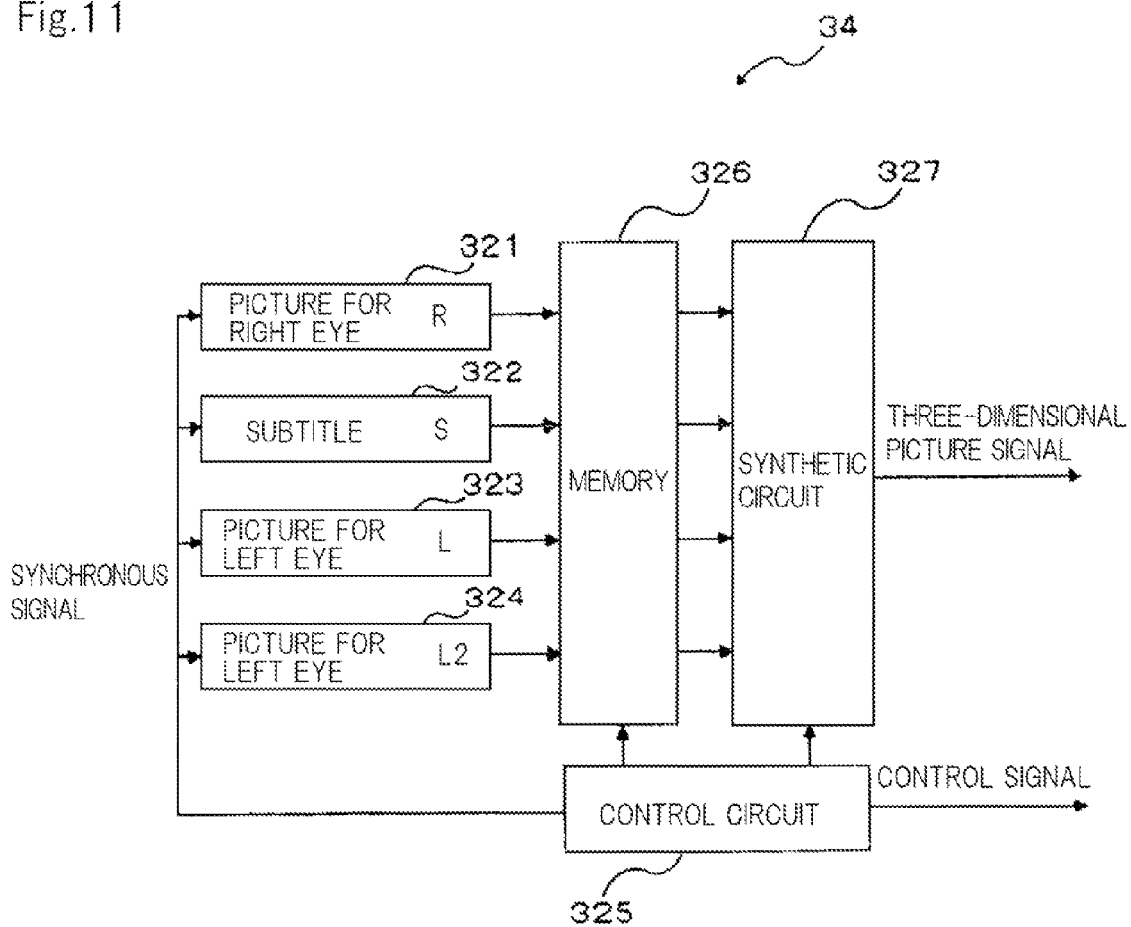
FIG. 11 A block diagram showing a specific configuration of control means of the three-dimensional picture viewing system shown in FIG. 10.

FIG. 11 is a block diagram showing a specific configuration of control means 34.

Control means 34 shown in FIG. 11 includes four picture playback devices 321, 322, 323, and 324, control circuit 325, memory 326, and synthetic circuit 327.

Picture playback device 321 plays a medium on which right eye picture R has been recorded. Picture playback device 322 plays a medium on which subtitle S has been recorded. Picture playback device 323 plays a medium on which left eye picture L1 has been recorded. Picture playback device 324 plays a medium on which left eye picture L2 has been recorded. A synchronous signal has been supplied to each of picture playback devices 321, 322, 323, and 324 from control circuit 325. Picture playback devices 321, 322, 323, and 324 reproduce frames of the media in synchronization based on the synchronous signal from control circuit 325. Video signals reproduced at picture playback devices 321, 322, 323, and 324 in synchronization are output to memory 326.

The procedure for making a recording media on which right eye picture R, left eye picture L1, and left eye picture L2 have been recorded is briefly described. To acquire right eye picture R, left eye picture L1, and left eye picture L2, first and second cameras located at the interval of both human eyes, and a third camera located in a middle position between these cameras are used. Right eye picture R and left eye picture L1 are shot by the first and second cameras, and simultaneously left eye picture P2 having three-dimensionality reduced is shot by the third camera. The pictures from the first to third cameras are directly recorded, or edited and processed to be recorded on a medium such as a magnetic tape. The media on which right eye picture R, left eye picture L1, and left eye picture L2 have been recorded are accordingly acquired. As recording media, a DVD and a hard disk can be used in addition to the magnetic tape.

Image data of right eye picture R, subtitle S, left eye picture L1, and left eye picture L2 having three-dimensionality reduced are stored by frames in memory 326. Control circuit 325 controls reading of the image data from memory 326. In memory 326, the stored image data are sequentially read at a frequency four times larger than that of the synchronous signal. Each image data read from memory 326 is supplied to synthetic circuit 327.

An operation of synthetic circuit 327 is controlled by control circuit 325. Synthetic circuit 327 multiplexes, in a time-division manner, the image data sequentially read from memory 326 at a frequency that is four times larger than that of the synchronous signal. In other words, synthetic circuit 327 time-sequentially synthesizes signals of right eye picture R, left eye picture L1, subtitle S, and left eye picture L2 having three-dimensionality reduced at a frequency that is four times larger to generate a three-dimensional picture signal. During the generation of the three-dimensional picture signal by synthetic circuit 327, control circuit 325 generates a control signal synchronized with the generated three-dimensional picture signal.

Display system 32 can be configured such that the three-dimensional picture signal generated by synthetic circuit 327 is recorded on a recording medium and the recording medium is played when necessary. In such a case, a control signal is generated from a synchronous signal synchronized with a three-dimensional picture signal acquired by playing the recording medium.

Figure 12:
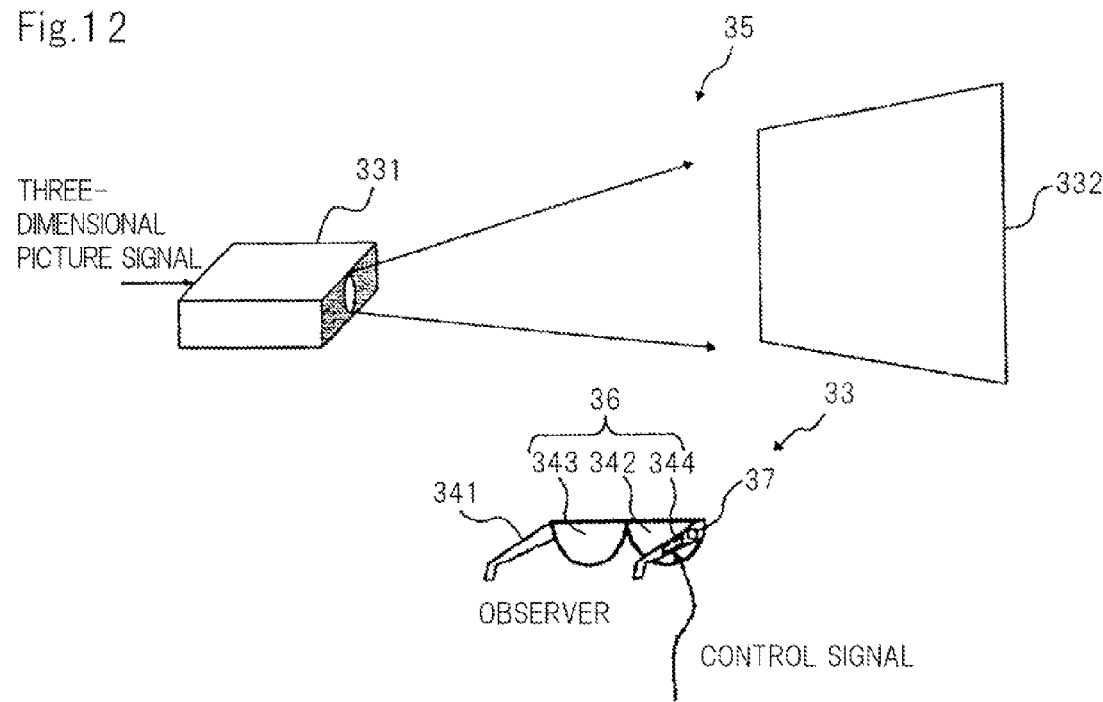
FIG. 12 A schematic view showing a specific configuration of display means and an optical shutter of the three-dimensional picture viewing system shown in FIG. 10.

FIG. 12 shows a specific configuration of display means 35 and optical shutter 33.

As shown in FIG. 12, display means 35 includes projector 331 and screen 332. Projector 331 receives the three-dimensional picture signal input from control means 34, and time-sequentially projects right eye picture R, subtitle S, left eye picture L1, and left eye picture L2 having three-dimensionality reduced to screen 332.

The observer views the three-dimensional picture through optical shutter 33 shown in FIG. 12. Optical shutter 33 includes shutter means 36 that includes right eye optical shutter 342, left eye optical shutter 343, and optical shutter driving circuit 344, and input means 37 for selecting a display mode. In the embodiment, optical shutter 33 is formed into a shape of eyeglasses, namely, three-dimensional eyeglasses 341.

Right eye optical shutter 342 and left eye optical shutter 343 are liquid crystal optical shutters, each of which includes a liquid crystal in which a cell is formed by using two glass substrates on which transparent electrodes are formed and a liquid crystal is filled in a space between the glass substrates, a polarization plate being provided to the light entrance/exit surface of the liquid crystal. Right eye optical shutter 342 and left eye optical shutter 343 transmit light when no voltage is applied to the transparent electrodes, and block light when voltages are applied to the transparent electrodes.

Optical shutter driving circuit 344 determines, according to the display mode that the observer has selected by input means 37, opening/closing timings based on the control signal transmitted from control means 34, and independently controls opening/closing of right eye optical shutter 342 and left eye optical shutter 343.

FIGS. 13 and 14 are timing charts each showing a relationship among a display picture displayed by display means 35, a control signal, and a state of the optical shutter of three-dimensional eyeglasses 341 in each display mode.

The display picture is displayed at a repetition frequency of 60 hertz with right eye picture R, subtitle S, left eye picture L1, and left eye picture L2 having three-dimensionality reduced constituting one frame. In other words, a picture of each subframe is switched at a frequency of 240 hertz to be displayed.

The control signal is set to a high level only when, for example, right eye picture R is displayed. Based on this signal, display timings of subtitle S, left eye picture L1, and left eye picture L2 having three-dimensionality reduced can be specified.

First, referring to FIG. 13, among the six display modes that the observer can select, the four modes that relate to a three-dimensional display are described.

An observer good at or accustomed to three-dimensional viewing and needing no subtitle selects a three-dimensional display (without a subtitle) as a display mode. When the three-dimensional display (without a subtitle) is selected, optical shutter 33 is controlled to open, based on the control signal, right eye optical shutter 342 when right eye picture R is displayed, and open left eye optical shutter 343 when left eye picture L1 is displayed. In this case, the observer watches right eye picture R and left eye picture L1 respectively with left and right eyes, and can accordingly view a normal three-dimensional picture.

On the other hand, an observer who is good at or accustomed to three-dimensional viewing and who needs a subtitle, selects a three-dimensional display (with a subtitle). When the three-dimensional display (with a subtitle) is selected, optical shutter 33 is controlled to open, based on the control signal, right eye optical shutter 342 when right eye picture R and subtitle S are displayed, and to open left eye optical shutter 343 when subtitle S and left eye picture L1 are displayed. In this case, the observer watches right eye picture R and left eye picture L1 respectively with left and right eyes, and can accordingly view a normal three-dimensional picture and read subtitle S.

An observer who is not good at or unaccustomed to three-dimensional viewing selects a three-dimensional display (without a subtitle) having three-dimensionality reduced. When the three-dimensional display having three-dimensionality reduced is selected, optical shutter 33 is controlled to open, based on the control signal, right eye optical shutter 342 when right eye picture R is displayed, and to open left eye optical shutter 343 when left eye picture L2 having three-dimensionality reduced is displayed. In this case, the observer watches right eye picture R and left eye picture L2 having three-dimensionality reduced respectively with left and right eyes, and can accordingly view a three-dimensional picture having three-dimensionality reduced.

On the other hand, an observer who is not good at or who is not accustomed to three-dimensional viewing and who needs a subtitle, selects a three-dimensional display (with a subtitle) having three-dimensionality reduced. When the three-dimensional display (with a subtitle) having three-dimensionality reduced is selected, optical shutter 33 is controlled to open, based on the control signal, right eye optical shutter 342 when right eye picture R and subtitle S are displayed, and to open left eye optical shutter 343 when left eye picture L2 having three-dimensionality reduced and subtitle S are displayed. In this case, the observer watches right eye picture R and left eye picture L2 having three-dimensionality reduced respectively with left and right eyes, and can accordingly view a three-dimensional picture having three-dimensionality reduced and read subtitle S.

Next, referring to FIG. 14, among the six display modes that the observer can select, the two display modes that relate to a two-dimensional image display are described.

An observer who is not good at three-dimensional viewing or who experiences visual fatigue and who does not need a subtitle selects a two-dimensional image display (without a subtitle) as a display mode. When the two-dimensional image display (without a subtitle) is selected, optical shutter 33 is controlled to open, based on the control signal, right eye optical shutter 342 and left eye optical shutter 343 when right eye picture R is displayed, and to close right eye optical shutter 342 and left eye optical shutter 343 in other cases. In this case, the observer watches only right eye picture R simultaneously by left and right eyes, and can accordingly view a normal two-dimensional image.

On the other hand, an observer who is not good at three-dimensional viewing or who experiences visual fatigue and who needs a Japanese subtitle selects a two-dimensional image display (with a subtitle). When the two-dimensional image display (with a subtitle) is selected, optical shutter 33 is controlled to open, based on the control signal, right eye optical shutter 342 and left eye optical shutter 343 when right eye picture R and subtitle S are displayed, and to close right eye optical shutter 342 and left eye optical shutter 343 in other cases. In this case, the observer watches right eye picture R and subtitle S simultaneously by left and right eyes, and can accordingly view a normal two-dimensional picture with a subtitle.

In the embodiment, the one-frame period includes the four subframes, namely, right eye picture R, subtitle S, left eye picture L1, and left eye picture L2 having three-dimensionality reduced, and the pictures for the right eye and the left eye are selected therefrom. On the other hand, when simply six subframes, namely, right eye picture R without a subtitle, right eye picture R with a subtitle, left eye picture L1 without a subtitle, left eye picture L1 with a subtitle, left eye picture L2 without a subtitle having three dimensionality reduced, and left eye picture L2 with a subtitle having three dimensionality reduced, constitute one frame, and the pictures for the right eye and the left eye are selected therefrom, if a frame period is equal to that of the embodiment, a subframe period is shorter than that in the embodiment. When the subframe period is short, an image to be observed becomes dark. In the embodiment, the number of subframes can be reduced, and hence a period in which the optical shutter is open per unit time is longer, and the observer can view a bright image.

Both eyes watch a subtitle of the same subframe displayed in the same position of the screen and at the same timing, and hence no shifting occurs between a subtitle seen by the right eye and a subtitle seen by the left eye even when the observer tilts his head. In other words, an easily viewable subtitle display similar to that when a normal two-dimensional image is viewed can be acquired.

According to the embodiment, when a large audience simultaneously views the same three-dimensional picture such as a three-dimensional film, each observer can select, according to his own three-dimensional viewing aptitude, one picture from among a normal three-dimensional picture, a three-dimensional picture having three-dimensionality reduced and a two-dimensional picture on the spot, and make a selection in which a subtitle is present. As a result, a three-dimensional picture viewing system that gives consideration to a universal design enabling more people to view an easily viewable three-dimensional film can be acquired.

In the embodiment, in place of using the pictures shot by the first to third cameras, a three-dimensional picture generator can be used to generate a plurality of three-dimensional pictures from a smaller number of pictures. For example, right eye picture R, left eye picture L1, and left eye picture L2 having three-dimensionality reduced can be generated in real time by using an existing technology such as a technology of generating a plurality of three-dimensional pictures different in three-dimensionality from a two-dimensional picture having motion, a technology of generating a plurality of three-dimensional pictures different in three-dimensionality from two-dimensional image data and a depth map, or a technology of generating, from a set of three-dimensional images, a plurality of three-dimensional pictures different in three-dimensionality by interpolating or extrapolating a middle image thereof. Even when the pictures thus generated are used as picture sources for control means 34, a similar three-dimensional picture viewing system can be acquired. With this configuration, effects similar to those of the third embodiment can be acquired by using contents including no left eye picture L2 having three-dimensionality reduced or contents of only a two-dimensional image in which there is no three-dimensional image.

The embodiment has been directed to the case where right eye picture R, left eye picture L1, and left eye picture L2 having three-dimensionality reduced are used. However, left eye picture L3 emphasizing three-dimensionality shot by a camera located further outside the two cameras located at the interval of the human eyes can be used. In this case, a display picture includes five pictures, namely, right eye picture R, subtitle S, left eye picture L1, left eye picture L2 having three-dimensionality reduced, and left eye picture L3 emphasizing three-dimensionality, and is displayed at a repetition frequency of 60 hertz. A picture of each frame is switched at a frequency of 300 hertz to be displayed. There are totally eight display modes, namely, four display modes including a normal three-dimensional display, a three-dimensional display having three-dimensionality reduced, a three-dimensional display emphasizing three-dimensionality, and a two-dimensional image display, and display modes of the four in which the presence of subtitles is set. In this case, for operation control of three-dimensional eyeglasses 341, opening/closing is controlled according to the display mode. The same applies when six or more pictures are used.

Fourth Exemplary Embodiment

When a foreign film is shown with a subtitle, the subtitle of the mother language is usually provided. However, in some regions, subtitles of two languages or more may be necessary. In the embodiment, an observer views a three-dimensional picture by appropriately selecting one of six display modes, namely, a three-dimensional display without a subtitle, a three-dimensional display with a Japanese subtitle, a three-dimensional display with an English subtitle, a two-dimensional image display for an observer who is not good at three-dimensional viewing or who experiences visual fatigue, a two-dimensional image display with a Japanese subtitle, and a two-dimensional image display with an English subtitle.

Figure 15:
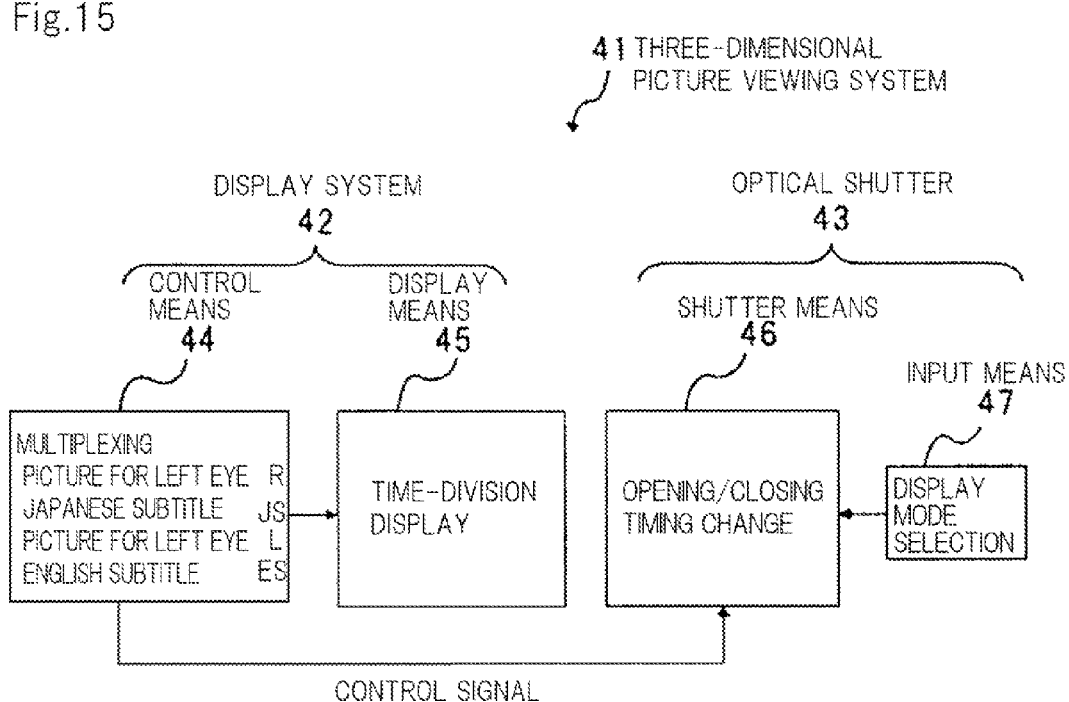
FIG. 15 A block diagram showing a configuration of a three-dimensional picture viewing system according to a fourth exemplary embodiment of the present invention.

FIG. 15 is a block diagram showing a configuration of a three-dimensional picture viewing system according to a fourth exemplary embodiment of the present invention.

As shown in FIG. 15, three-dimensional picture viewing system 41 includes display system 42 and optical shutter 43. Display system 42 includes control means 44 and display means 45. Optical shutter 43 includes shutter means 46 and input means 47. Control means 44 multiplexes picture signals of right eye picture R, left eye picture L1, Japanese subtitle JS, and English subtitle ES, which constitute a three-dimensional picture, in a time-division manner to generate a three-dimensional picture signal, and transmits the three-dimensional picture signal to display means 45. Simultaneously, control means 44 transmits a control signal indicating frame switching of the pictures to shutter means 46.

Display means 45 time-sequentially switches and displays right eye picture R, Japanese subtitle JS, left eye picture L1, and English subtitle ES based on the input three-dimensional picture signal. Shutter means 46 includes right eye and left eye optical shutters constituting three-dimensional eyeglasses, which are similar to those of the first embodiment. The right eye and left eye liquid crystal optical shutters can independently control opening/closing. Shutter means 46 determines, according to a display mode that the observer has selected by input means 47, an opening/closing timing and an opening/closing period based on the control signal to control opening/closing of the right eye and left eye optical shutters.

Figure 16:
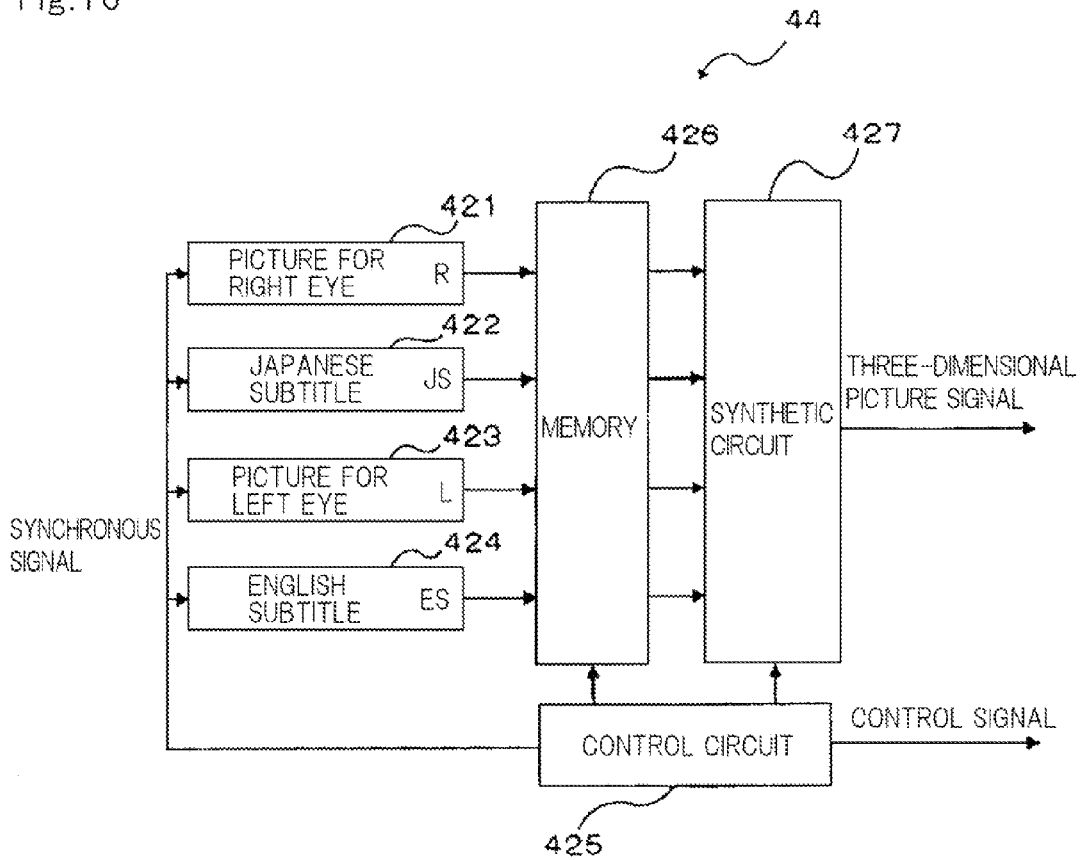
FIG. 16 A block diagram showing a specific configuration of control means of the three-dimensional picture viewing system shown in FIG. 15.

FIG. 16 is a block diagram showing a specific configuration of control means 44.

Control means 44 shown in FIG. 16 includes four picture playback devices 421, 422, 423, and 424, control circuit 425, memory 426, and synthetic circuit 427.

Picture playback device 421 plays a medium on which right eye picture R has been recorded. Picture playback device 422 plays a medium on which Japanese subtitle JS has been recorded. Picture playback device 423 plays a medium on which left eye picture L1 has been recorded. Picture playback device 424 plays a medium on which English subtitle ES has been recorded. As a recording medium, a DVD or a hard disk can be used in addition to the magnetic tape A synchronous signal has been supplied to each of picture playback devices 421, 422, 423, and 424 from control circuit 425. Picture playback devices 421, 422, 423, and 424 reproduce frames of the media in synchronization based on the synchronous signal from control circuit 425. Video signals reproduced at picture playback devices 421, 422, 423, and 424 in synchronization are output to memory 426.

Image data of right eye picture R, Japanese subtitle JS, left eye picture L1, and English subtitle ES are stored by frames in memory 426. Control circuit 425 controls reading of the image data from memory 426. In memory 426, the stored image data are sequentially read at a frequency four times larger than that of the synchronous signal. Each image data read from memory 426 is supplied to synthetic circuit 427.

An operation of synthetic circuit 427 is controlled by control circuit 425. Synthetic circuit 427 multiplexes, in a time-division manner, the image data sequentially read from memory 426 at a frequency that is four times larger than that of the synchronous signal. In other words, synthetic circuit 427 time-sequentially synthesizes signals of right eye picture R, Japanese subtitle JS, left eye picture L, and English subtitle ES at a frequency that is four times larger to generate a three-dimensional picture signal. During the generation of the three-dimensional picture signal by synthetic circuit 427, control circuit 425 generates a control signal synchronized with the generated three-dimensional picture signal.

Display system 42 can be configured such that the three-dimensional picture signal generated by synthetic circuit 427 is recorded on a recording medium and the recording medium is played when necessary. In such a case, a control signal is generated from a synchronous signal synchronized with a three-dimensional picture signal acquired by playing the recording medium.

Figures 17, 18:
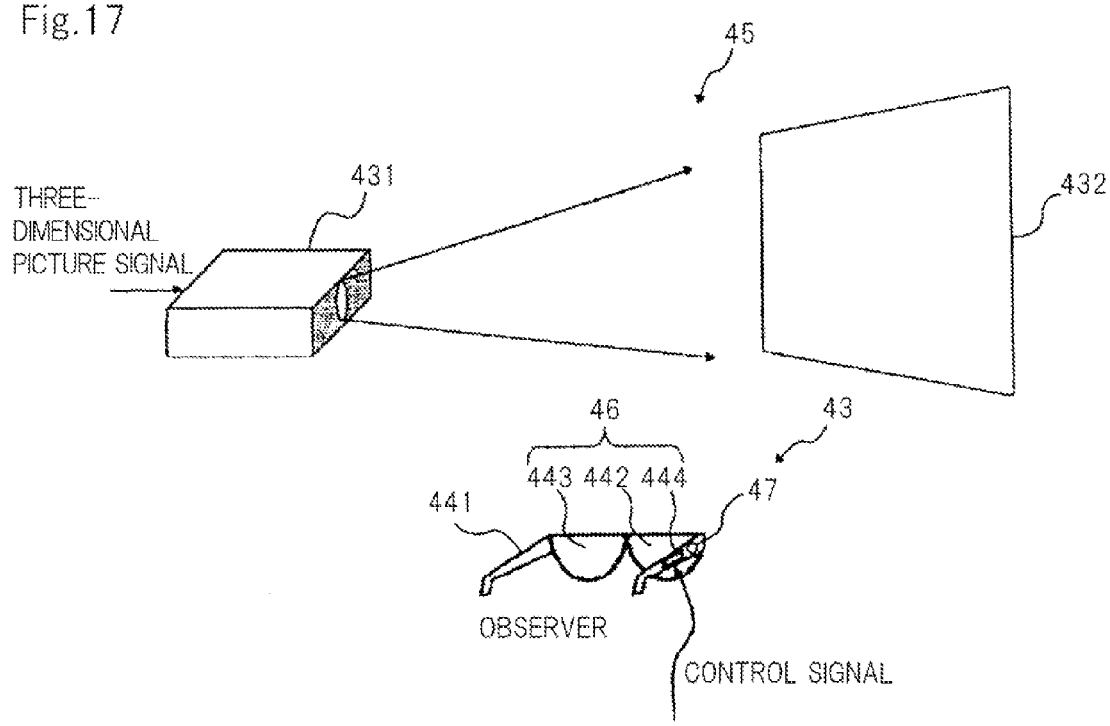
FIG. 17 A schematic view showing a specific configuration of display means and an optical shutter of the three-dimensional picture viewing system shown in FIG. 15.
FIG. 18 An explanatory timing chart showing a relationship between a state of the optical shutter and a display mode in the three-dimensional picture viewing system shown in FIG. 15.

FIG. 17 shows a specific configuration of display means 45 and optical shutter 43.

Display means 45 shown in FIG. 17 includes projector 431 and screen 432. Projector 431 receives the three-dimensional picture signal input from control means 44, and time-sequentially projects right eye picture R, Japanese subtitle JS, left eye picture L, and English subtitle ES to screen 432.

The observer views the three-dimensional picture through optical shutter 43 shown in FIG. 17. Optical shutter 43 includes shutter means 46 that includes right eye optical shutter 442, left eye optical shutter 443, and optical shutter driving circuit 444, and input means 47 for selecting a display mode. In the embodiment, optical shutter 43 is formed into a shape of eyeglasses, namely, three-dimensional eyeglasses 441.

Right eye optical shutter 442 and left eye optical shutter 443 are liquid crystal optical shutters, each of which includes a liquid crystal in which a cell is formed by using two glass substrates on which transparent electrodes are formed and a liquid crystal is filled in a space between the glass substrates, a polarization plate being provided to the light entrance/exit surface of the liquid crystal. Right eye optical shutter 442 and left eye optical shutter 443 transmit light when no voltage is applied to the transparent electrodes, and block light when voltages are applied to the transparent electrodes.

Optical shutter driving circuit 444 determines, according to the display mode that the observer has selected by input means 47, opening/closing timings based on the control signal transmitted from control means 44, and independently controls opening/closing of right eye optical shutter 442 and left eye optical shutter 443.

Figure 19:
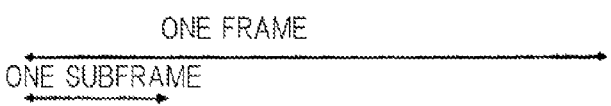
FIG. 19 An explanatory timing chart showing a relationship between the state of the optical shutter and another display mode in the three-dimensional picture viewing system shown in FIG. 15.

FIGS. 18 and 19 are timing charts each showing the relationship among the display picture displayed by display means 45, the control signal, and the state of the optical shutter of three-dimensional eyeglasses 441 in each display mode.

The display picture is displayed at a repetition frequency of 60 hertz with right eye picture R, Japanese subtitle JS, left eye picture L, and English subtitle ES constituting one frame. In other words, a picture of each subframe is switched at a frequency of 240 hertz to be displayed.

The control signal is set to a high level only when, for example, right eye picture R is displayed. Based on this signal, display timings of Japanese subtitle JS, left eye picture L, and English subtitle ES can be specified.

First, referring to FIG. 18, among the six display modes that the observer can select, the three modes that relate to a three-dimensional display are described.

An observer who does not need a subtitle selects, among three-dimensional displays, a three-dimensional display (without a subtitle) as a display mode. When the three-dimensional display (without a subtitle) is selected, optical shutter 43 is controlled to open, based on the control signal, right eye optical shutter 442 when right eye picture R is displayed, and to open left eye optical shutter 443 when left eye picture L is displayed. In this case, the observer watches right eye picture R and left eye picture L respectively with left and right eyes, and can accordingly view a normal three-dimensional picture.

On the other hand, an observer who needs a Japanese subtitle selects a three-dimensional display (with a Japanese subtitle). When the three-dimensional display (with a Japanese subtitle) is selected, optical shutter 43 is controlled to open, based on the control signal, right eye optical shutter 442 when right eye picture R and Japanese subtitle JS are displayed, and to open left eye optical shutter 443 when Japanese subtitle JS and left eye picture L are displayed. In this case, the observer watches right eye picture R and left eye picture L respectively with left and right eyes, and can accordingly view a normal three-dimensional picture and read Japanese subtitle JS.

An observer who needs an English subtitle selects a three-dimensional display (with an English subtitle). When the three-dimensional display (with an English subtitle) is selected, optical shutter 43 is controlled to open, based on the control signal, right eye optical shutter 442 when right eye picture R and English subtitle ES are displayed, and to open left eye optical shutter 443 when English subtitle JS and left eye picture L are displayed. In this case, the observer watches right eye picture R and left eye picture L respectively with left and right eyes, and can accordingly view a three-dimensional picture and read English subtitle JS.

Next, referring to FIG. 19, among the six display modes that the observer can select, the three modes that relate to a two-dimensional image display are described.

An observer who is not good at three-dimensional viewing or who experiences visual fatigue and who does not need a subtitle selects a two-dimensional image display (without a subtitle) as a display mode. When the two-dimensional image display (without a subtitle) is selected, optical shutter 43 is controlled to open, based on the control signal, right eye optical shutter 442 and left eye optical shutter 443 when right eye picture R is displayed, and to close right eye optical shutter 442 and left eye optical shutter 443 in other cases. In this case, the observer watches only right eye picture R simultaneously by left and right eyes, and can accordingly view a normal two-dimensional image.

On the other hand, an observer who is not good at three-dimensional viewing or who experiences visual fatigue and who needs a Japanese subtitle selects a two-dimensional image display (with a Japanese subtitle). When the two-dimensional image display (with a Japanese subtitle) is selected, optical shutter 43 is controlled to open, based on the control signal, right eye optical shutter 442 and left eye optical shutter 443 when right eye picture R and Japanese subtitle JS are displayed, and to close right eye optical shutter 442 and left eye optical shutter 443 in other cases. In this case, the observer watches right eye picture R and Japanese subtitle JS simultaneously by left and right eyes, and can accordingly view a normal two-dimensional picture with a Japanese subtitle.

An observer who is not good at three-dimensional viewing or who experiences visual fatigue and who needs an English subtitle selects a two-dimensional image display (with an English subtitle). When the two-dimensional image display (with an English subtitle) is selected, optical shutter 43 is controlled to open, based on the control signal, right eye optical shutter 442 and left eye optical shutter 443 when right eye picture R and English subtitle ES are displayed, and to close right eye optical shutter 442 and left eye optical shutter 443 in other cases. In this case, the observer watches right eye picture R and English subtitle ES simultaneously by left and right eyes, and can accordingly view a normal two-dimensional picture with an English subtitle.

In the embodiment, the one-frame period includes the four subframes, namely, right eye picture R, Japanese subtitle JS, left eye picture L, and English subtitle ES, and the pictures for the right eye and the left eye are selected therefrom. On the other hand, when simply six subframes, namely, right eye picture R without a subtitle, right eye picture R with a Japanese subtitle, right eye picture R with an English subtitle, left eye picture L without a subtitle, left eye picture L with Japanese subtitle, and left eye picture L with English subtitle, constitute one frame, and the pictures for the right eye and the left eye are selected therefrom, if a frame period is equal to that of the embodiment, a subframe period is shorter than that in the embodiment. When the subframe period is short, an image to be observed becomes dark. In the embodiment, the number of subframes can be reduced, and hence a period in which the optical shutter is open per unit time is longer, and the observer can view a bright image.

Both eyes watch a subtitle of the same subframe displayed in the same position of the screen and at the same timing, and hence no shifting occurs between a subtitle seen by the right eye and a subtitle seen by the left eye even when the observer tilts his head. In other words, an easily viewable subtitle display similar to that when a normal two-dimensional image is viewed can be acquired.

According to the embodiment, when the large audience simultaneously views the same three-dimensional picture such as a three-dimensional film, each observer can select, according to his own three-dimensional viewing aptitude a normal three-dimensional picture or a two-dimensional picture on the spot, and make a selection in which subtitles in a plurality of languages are present. As a result, a three-dimensional picture viewing system that gives consideration to a universal design enabling more people to view an easily viewable three-dimensional film can be acquired.

Display means 5 is a projection display device that uses projector 31 and screen 32. In place of this device, a direct-view type display device such as a liquid crystal television or a plasma television can be used.

The control signal transmitted from control means 4 to optical shutter 4 can be transmitted to shutter means 61 via display means 5.

According to the three-dimensional picture viewing system of the present invention described above, the display system multiplexes and displays, in a time-division manner, two or more pictures that are different in parallax and that constitute a three-dimensional picture, and three or more pictures that include at least one picture with a subtitle, and outputs a control signal indicating the switching timing of each picture. When the observer designates, by the input means, an arbitrary display mode among a plurality of display modes in which display pictures to be viewed are defined among the three or more pictures, the shutter driving circuit specifies, based on the control signal, switching timings of the display pictures corresponding to the designated display mode, and independently controls opening/closing of the two shutters for switching a state of transmitting light and a state of blocking light at the specified switching timings of the pictures.

With the abovementioned configuration, the observer can freely select a picture with a subtitle or a picture without a subtitle to observe it only by designating a display mode. Thus, a three-dimensional picture viewing system highly usable for the observer can be provided.

Both eyes watch the picture with a subtitle of the same subframe displayed on the same position of the screen, and hence a more viewable subtitle display can be provided to the observer.

Furthermore, the following effects can be provided.

As a related technology of the present invention, a configuration may be employed, in which a picture with a subtitle and a picture without a subtitle are prepared for the right eye picture and the left eye picture, pictures into which subtitles in different languages are inserted are prepared, these pictures are multiplexed to be displayed in a time-division manner, and shutter eyeglasses select a picture. In this case, however, there are problems of an increase in complexity of inserting the subtitles into the respective pictures and the picture being darker due to a shorter display period of the selected picture. There is also a technical problem of switching the display device or the shutter eyeglasses at a high speed.

According to the present invention, for example, a configuration can be employed, in which the three subframes, namely, the right eye picture, the left eye picture, and the picture with a subtitle, are multiplexed to be displayed, and hence the number of subframes can be smaller than that in the case of the abovementioned related technology. As a result, a period in which the optical shutter is open per unit time can be longer, and the observer can view a bright picture.

According to the present invention, the display system can include control means for outputting a three-dimensional picture signal generated by multiplexing the three or more pictures in a time-division manner, and display means for displaying a picture based on the three-dimensional picture signal.

The control means can include three or more picture playback devices for reproducing the three or more pictures, and generate the three-dimensional picture signal by controlling the synchronization of these picture playback devices.

The control means can generate the three or more pictures from picture data smaller in number than these pictures.

According to the present invention described above, the observer can freely select a picture with a subtitle or a picture without a subtitle to observe it only by designating a display mode. Thus, a three-dimensional picture viewing system highly usable for the observer can be provided.

Both eyes watch the picture with a subtitle of the same subframe displayed on the same position of the screen, and hence a more viewable subtitle display can be provided to the observer.

The embodiments of the present invention have been described. However, the present invention is not limited to the embodiments. Various changes understandable to those skilled in the art can be made of the configuration and the operation of the present invention without departing from the spirit and scope of the invention.

This application is the National Phase of PCT/JP2010/050248, filed Jan. 13, 2010 which claims priority from Japanese Patent Application No. 2009-012142 filed Jan. 22, 2009, which is hereby incorporated by reference herein in its entirety.

The invention claimed is:

1. A three-dimensional picture viewing system comprising:
 a display system configured to display a display picture whose frame is made of a plurality of subframes, wherein the display system allocates, to the subframes, three or more pictures that comprise two or more pictures with different parallaxes, which constitute a three-dimensional picture, and at least one subtitle picture, in order to multiplex and display the three or more pictures in a time-division manner, and outputs a control signal that indicates a switching timing of each picture;
 an input unit that designates an arbitrary display mode from among a plurality of different display modes in which display pictures to be viewed are defined from among the three or more pictures;
 two shutters that switch a state in which light is transmitted and a state in which light is blocked; and
 a shutter driving circuit that specifies switching timings of the display pictures corresponding to the display mode designated by the input unit based on the control signal, and independently controls opening/closing of the two shutters based on the specified switching timings of the pictures, wherein, in at least one display mode of the plurality of display modes, the shutter driving circuit separately opens each of the two shutters during two or more subframe periods of one frame period and simultaneously opens the two shutters during at least one subframe period of the one frame period, and
 the two or more subframe periods of the one frame period are of equal duration.

2. The three-dimensional picture viewing system according to claim 1,
 wherein the display system comprises:
 a control unit that outputs a three-dimensional picture signal generated by multiplexing the three or more pictures in a time-division manner; and
 a display unit that displays a picture based on the three-dimensional picture signal.

3. The three-dimensional picture viewing system according to claim 2, wherein the control unit comprises three or more picture playback devices that respectively reproduce the three or more pictures, and generates the three-dimensional picture signal by controlling synchronization of the picture playback devices.

4. The three-dimensional picture viewing system according to claim 2, wherein the control means unit generates the three or more pictures from picture data smaller in number than the pictures.

5. The three-dimensional picture viewing system according to claim 1, wherein:
 the two or more pictures with the different parallaxes comprise a right eye picture and a left eye picture;
 the plurality of different display modes comprises a first display mode in which a three-dimensional display without a subtitle is provided by the right eye picture and the left eye picture, and a second display mode in which a three-dimensional display with a subtitle is provided by the right eye picture, the left eye picture, and the subtitle picture; and
 the shutter driving circuit performs control to:
 open, when the input unit designates the first display mode, one of the two shutters and close the other shutter during a display period of the right eye picture, close both the one shutter and the other shutter during a display period of the subtitle picture, and close the one shutter and open the other shutter during a display period of the left eye picture; and
 open, when the input unit designates the second display mode, the one shutter and close the other shutter during the display period of the right eye picture, open both the one shutter and the other shutter during the display period of the subtitle picture, and close the one shutter and open the other shutter during the display period of the left eye picture.

6. The three-dimensional picture viewing system according to claim 5, wherein:
 the plurality of different display modes further comprises a third display mode in which a two-dimensional image display without a subtitle is provided by one picture from among the right eye picture and the left eye picture, and a fourth display mode in which a two-dimensional image display with a subtitle is provided by the one picture and the subtitle picture; and
 the shutter driving circuit performs control to:
 open, when the input unit designates the third display mode, both the one shutter and the other shutter during the display period of the one picture, and close both the one shutter and the other shutter during other periods; and
 open, when the input unit designates the fourth display mode, both the one shutter and the other shutter both during the display period of the one picture and during the display period of the subtitle picture, and close both the one shutter and the other shutter during other periods.

7. The three-dimensional picture viewing system according to claim 1, wherein:
 the plurality of different display modes comprises a plurality of no-subtitle three-dimensional display modes in which a plurality of three-dimensional pictures without a subtitle different in three-dimensionality are defined by a combination of two of the three or more pictures with the different parallaxes, and a plurality of subtitle three-dimensional display modes in which a plurality of three-dimensional pictures with a subtitle different in three-dimensionality are defined by a combination of two of the three or more pictures with the different parallaxes; and the shutter driving circuit performs control to:

open, when the input unit designates one of the plurality of no subtitle three-dimensional display modes, one of the two shutters and close the other shutter during a display period of one of the two pictures with the different parallaxes corresponding to the designated non-subtitle display mode, close the one shutter and open the other shutter during a display period of the other of the two pictures, and close both the one shutter and the other shutter during a display period of the subtitle picture; and open, when the input unit designates one of the plurality of subtitle three-dimensional display modes, one of the two shutters and close the other shutter during the display period of one of the two pictures with the different parallaxes corresponding to the designated non-subtitle and subtitle display mode, close the one shutter and open the other shutter during the display period of the other of the two pictures, and open both the one shutter and the other shutter during the display period of the subtitle picture.

8. The three-dimensional picture viewing system according to claim 7, wherein:

the plurality of different display modes further comprises a no subtitle two-dimensional image display mode in which a two-dimensional image display without a subtitle is provided by one picture from among the three or more pictures with the different parallaxes, and a subtitle two-dimensional image display mode in which a two-dimensional image display with a subtitle and without a subtitle is provided by the one picture and the subtitle picture; and the shutter driving circuit performs control to:

open, when the input unit designates the no subtitle two-dimensional image display mode, both the one shutter and the other shutter during a display period of the one picture, and close both the one shutter and the other shutter during other periods; and open, when the input unit designates the subtitle two-dimensional image display mode, both the one shutter and the other shutter both during the display period of the one picture and during the display period of the subtitle picture, and close both the one shutter and the other shutter during other periods.

9. The three-dimensional picture viewing system according to claim 1, wherein:

the two or more pictures with the different parallaxes comprise a right eye picture and a left eye picture;

the subtitle picture comprises first and second subtitle pictures in which pictures of different languages are displayed;

the plurality of different display modes comprises a first display mode in which a three-dimensional display without a subtitle is provided by the right eye picture and the left eye picture, a second display mode in which a three-dimensional display with a subtitle is provided by the right eye picture, the left eye picture, and the first subtitle picture, and a third display mode in which a three-dimensional display with a subtitle is provided by the right eye picture, the left eye picture, and the second subtitle picture; and the shutter driving circuit performs control to:

open, when the input unit designates the first display mode, one of the two shutters and close the other shutter during a display period of the right eye picture, close both the one shutter and the other shutter during a display period of each of the first and second subtitle pictures, and close the one shutter and open the other shutter during a display period of the left eye picture;

open, when the input unit designates the second display mode, the one shutter and close the other shutter during the display period of the right eye picture, open both the one shutter and the other shutter during the display period of the first subtitle picture, close the one shutter and open the other shutter during the display period of the left eye picture, and close both the one shutter and the other shutter during the display period of the second subtitle picture; and open, when the input unit designates the third display mode, the one shutter and close the other shutter during the display period of the right eye picture, open both the one shutter and the other shutter during the display period of the second subtitle picture, close the one shutter and open the other shutter during the display period of the left eye picture, and close both the one shutter and the other shutter during the display period of the first subtitle picture.

10. The three-dimensional picture viewing system according to claim 9, wherein:

the plurality of different display modes further comprises a fourth display mode in which a two-dimensional image display without a subtitle is provided by one picture from among the right eye picture and the left eye picture, a fifth display mode in which a two-dimensional image display with a subtitle is provided by the one picture and the first subtitle picture, and a sixth display mode in which a two-dimensional image display with a subtitle is provided by the one picture and the second subtitle picture; and the shutter driving circuit performs control to:

open, when the input unit designates the fourth display mode, both the one shutter and the other shutter during the display period of the one picture, and close both the one shutter and the other shutter during other periods;

open, when the input unit designates the fifth display mode, both the one shutter and the other shutter both during the display period of the one picture and during the display period of the first subtitle picture, and close both the one shutter and the other shutter during other periods; and open, when the input unit designates the sixth display mode, both the one shutter and the other shutter both during the display period of the one picture and during the display period of the second subtitle picture, and close both the one shutter and the other shutter during other periods.

11. A display system comprising:

a control unit that outputs a three-dimensional picture signal, which indicates a display picture whose frame is made of a plurality of subframes, and that outputs a control signal that indicates frame switching of the three-dimensional picture signal, wherein the three-dimensional picture signal is generated by allocating to the subframes three or more pictures that comprise two or more pictures with different parallaxes, which constitute a three-dimensional picture, and at least one subtitle picture in order to multiplex the three or more pictures in a time-division manner;

a control unit that outputs a three-dimensional picture signal that is generated by multiplexing three or more pictures that comprise two or more pictures with different parallaxes, which constitute a three-dimensional picture, and at least one subtitle picture in a time-division manner, and that outputs a control signal that indicates frame switching of the three-dimensional picture signal; and a display unit that displays a picture based on the three-dimensional picture signal from the control unit, wherein the control signal is supplied to an external device that specifies, based on the control signal, switching timings of the display pictures corresponding to a designated display mode, which is designated from among a plurality of different display modes in which display pictures to be viewed are defined from among the three or more pictures; independently controls opening/closing of two shutters based on the specified switching timings of the pictures; and, in at least one display mode of the plurality of different display modes, separately opens each of the two shutters during two or more subframe periods of one frame period and simultaneously opens the two shutters during at least one subframe period of the one frame period, and the two or more subframe periods of the one frame period are of equal duration.

12. An optical shutter communicable with a display system that configured to display a display picture whose frame is made of a plurality of subframes wherein the display system allocates, to the subframes three or more pictures that comprise two or more pictures with different parallaxes, which constitute a three-dimensional picture, and at least one subtitle picture, in order to multiplex and display the three or more pictures in a time-division manner, and outputs a control signal that indicates a switching timing of each picture, comprising:

an input unit that designates an arbitrary display mode among a plurality of display modes in which display pictures to be viewed are defined from among the three or more pictures;

two shutters that switch a state in which light is transmitted and a state in which light is blocked; and a shutter driving circuit that specifies switching timings of the display pictures corresponding to the display mode designated by the input unit based on the control signal, and that independently controls opening/closing of the two shutters based on the specified switching timings of the pictures, wherein, in at least one display mode of the plurality of different display modes, the shutter driving circuit separately opens each of the two shutters during two or more subframe periods of one frame period and simultaneously opens the two shutters during at least one subframe period of one frame period, and the two or more subframe periods of the one frame period are of equal duration.

13. A three-dimensional picture viewing method of in a display system configured to display a display picture whose frame is made of a plurality of subframes, allocating, to the subframes, three or more pictures that comprise two or more pictures with different parallaxes, which constitute a three-dimensional picture, and at least one subtitle picture, in order to multiplex and display the three or more pictures in a time-division manner, and of observing the displayed pictures via two shutters that switch a state in which light is transmitted and a state in which light is blocked, the method comprising:

receiving a control signal that indicates switching timings of the three or more pictures from the display system; and specifying, when an arbitrary display mode is designated from among a plurality of different display modes in which display pictures to be viewed are defined from among the three or more pictures, switching timings of the display pictures corresponding to the designated display mode based on the control signal, and independently controlling opening/closing of the two shutters based on the specified switching timings of the pictures; and separately opening, in at least one display mode of the plurality of different display modes, each of the two shutters during two or more subframe periods of one frame period and simultaneously opening the two shutters during at least one subframe period of the one frame period, and the two or more subframe periods of the one frame period are of equal duration.

14. The three-dimensional picture viewing system according to claim 1, wherein each of the two or more subframe periods of the one frame period is of an equal duration to the one subframe period.

15. The three-dimensional picture viewing system according to claim 1, wherein each of the two or more subframe periods of the one frame period is of a lesser duration than the one subframe period.

* * * * *